United States Patent [19]
Slipy et al.

[11] Patent Number: 5,848,152
[45] Date of Patent: Dec. 8, 1998

[54] COMMUNICATION DEVICE HAVING INTERCHANGEABLE FACEPLATES AND ACTIVE KEYPAD COVER

[75] Inventors: Michael J. Slipy, Waukegan; Louis J. Lundell, Buffalo Grove; Jose T. Lo, Wheeling; Nicholas Mischenko, Mt. Prospect, all of Ill.

[73] Assignee: Motorola, Inc., Schaumburg, Ill.

[21] Appl. No.: 759,503

[22] Filed: Dec. 4, 1996

Related U.S. Application Data

[63] Continuation-in-part of Ser. No. 742,379, Nov. 1, 1996, which is a continuation-in-part of Ser. No. 533,977, Sep. 26, 1995, and a continuation-in-part of Ser. No. 55,807, May 2, 1996, Pat. No. Des. 388,078, which is a continuation-in-part of Ser. No. 46,799, Oct. 18, 1995, Pat. No. Des. 388,080.

[51] Int. Cl.⁶ .................................................. H04M 1/00
[52] U.S. Cl. ........................................ 379/433; 379/434
[58] Field of Search ............................ 379/433, 434, 379/428; 455/90, 575

[56] References Cited

U.S. PATENT DOCUMENTS

| | | | |
|---|---|---|---|
| D. 300,742 | 4/1989 | Soren et al. .......................... | D14/148 |
| D. 309,901 | 8/1990 | Caesar ................................. | D14/244 |
| 3,838,229 | 9/1974 | Morrell et al. ........................ | 179/100 |
| 4,124,785 | 11/1978 | Seretny et al. ....................... | 179/103 |
| 4,292,481 | 9/1981 | Barnes et al. ........................ | 179/178 |
| 4,433,216 | 2/1984 | Isaacs .................................. | 179/178 |
| 4,582,966 | 4/1986 | Sutton et al. ......................... | 179/185 |
| 4,845,772 | 7/1989 | Metroka et al. ...................... | 379/61 |
| 5,086,463 | 2/1992 | Vesely et al. ......................... | 379/388 |
| 5,117,073 | 5/1992 | Mischenko .......................... | 200/61.7 |
| 5,175,759 | 12/1992 | Metroka et al. ...................... | 379/58 |
| 5,202,912 | 4/1993 | Breeden et al. ...................... | 379/57 |
| 5,235,636 | 8/1993 | Takagi et al. ........................ | 379/368 |
| 5,373,556 | 12/1994 | Johnson ............................... | 379/436 |

OTHER PUBLICATIONS

Mobile Office Magazine's "Cellular Buyers' Guide", pp. 53, 56, 58 and 59.

*Primary Examiner*—Jack Chiang
*Attorney, Agent, or Firm*—John G. Rauch

[57] ABSTRACT

A communication device (1600) such as a portable radiotelephone handset features interchangeable faceplates including a first faceplate (1604) and a second faceplate (1804) which are removably attachable to a housing (1602). At least one of the plurality of faceplates includes a movable element (1802) such as a keypad cover. A sensor such as a switch (1574) detects the presence of the movable element (1802) and provides a detection signal to a controller (1560) which varies the operation of the communication device (1600) in response thereto.

33 Claims, 21 Drawing Sheets

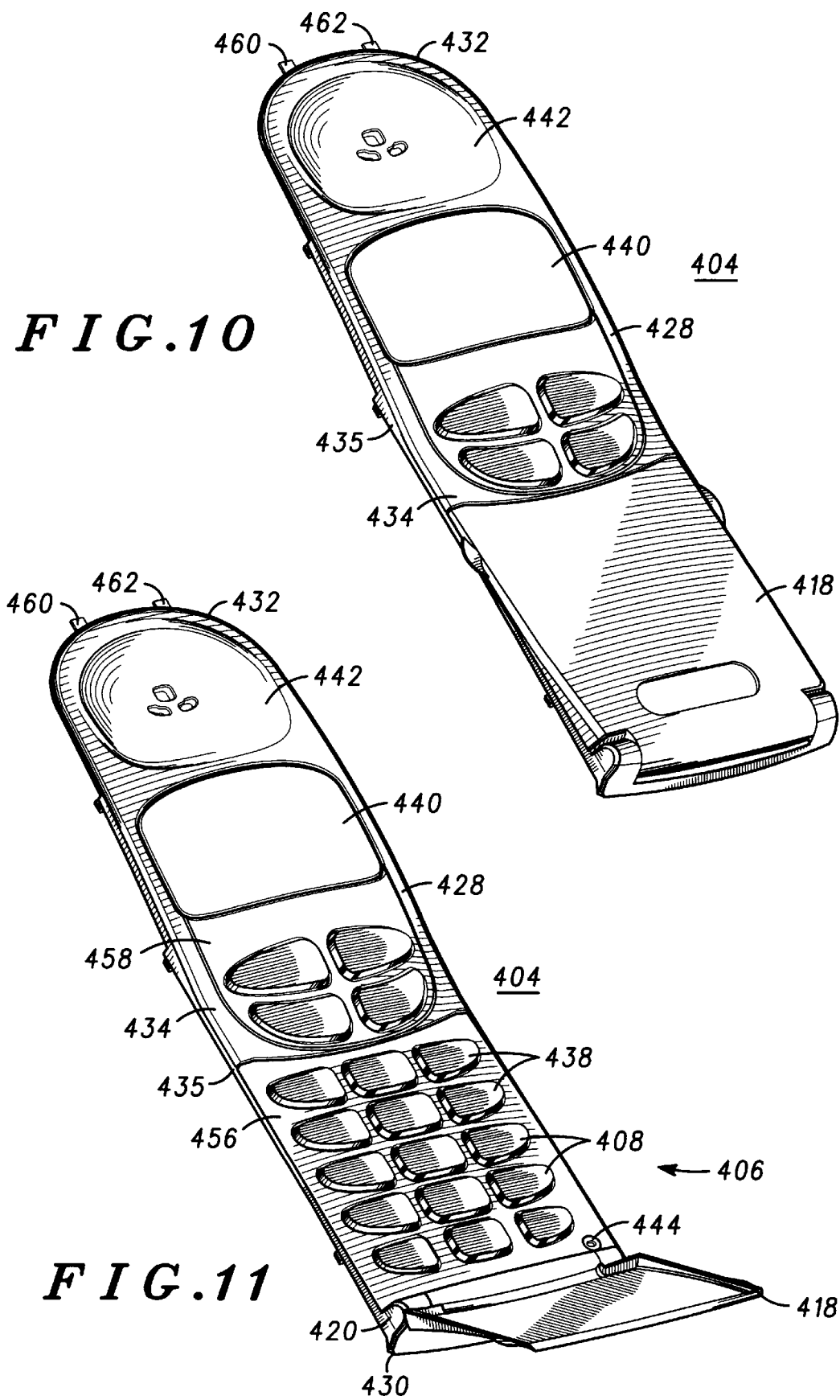

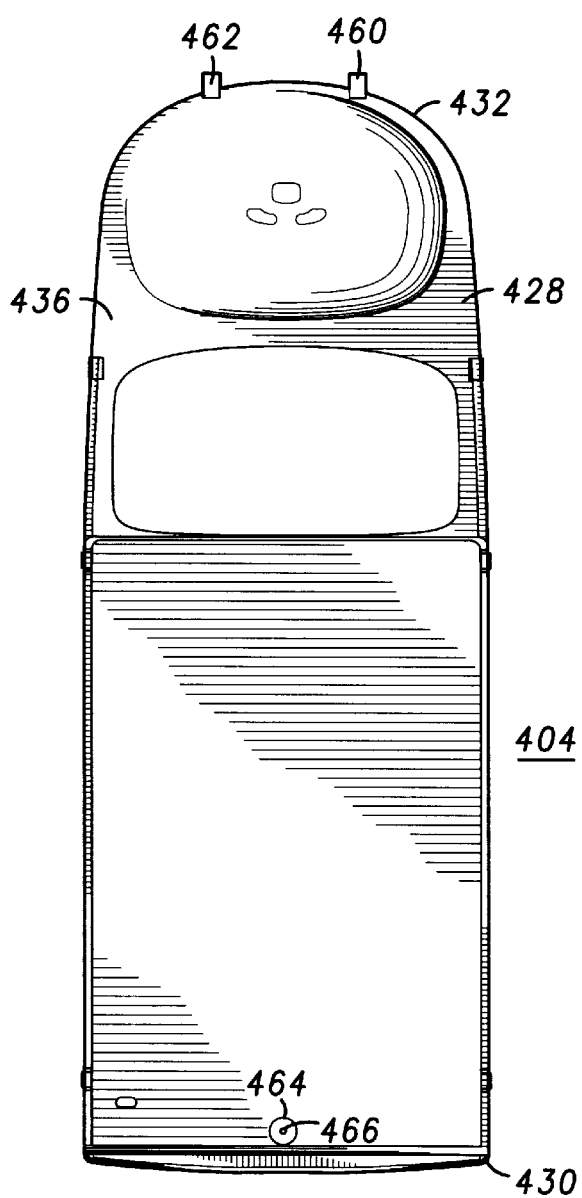
FIG.12
FIG.13
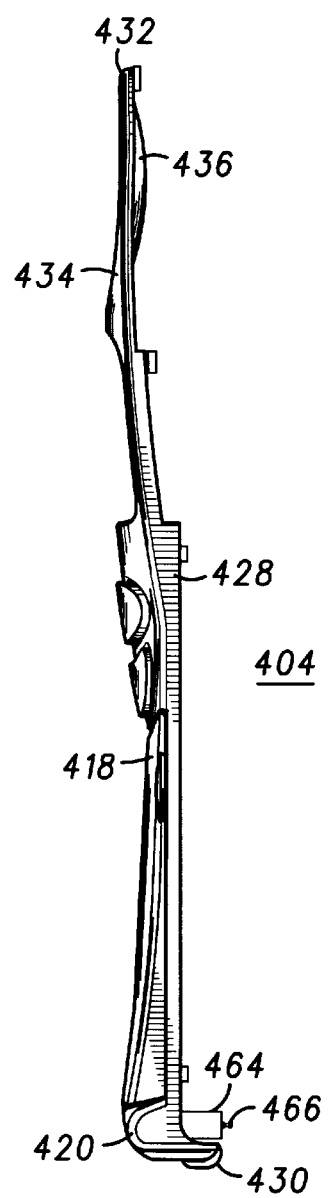
FIG.14

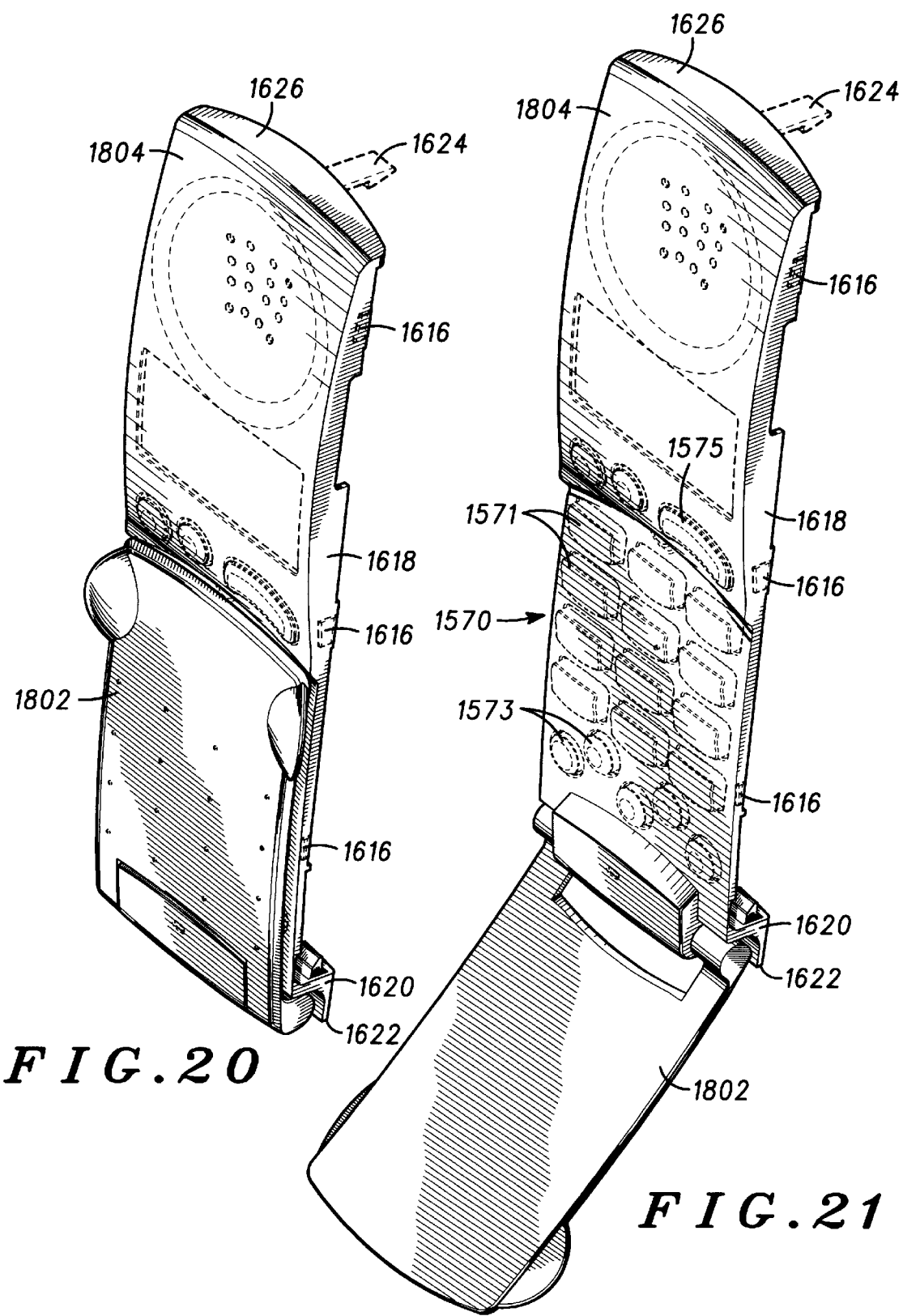

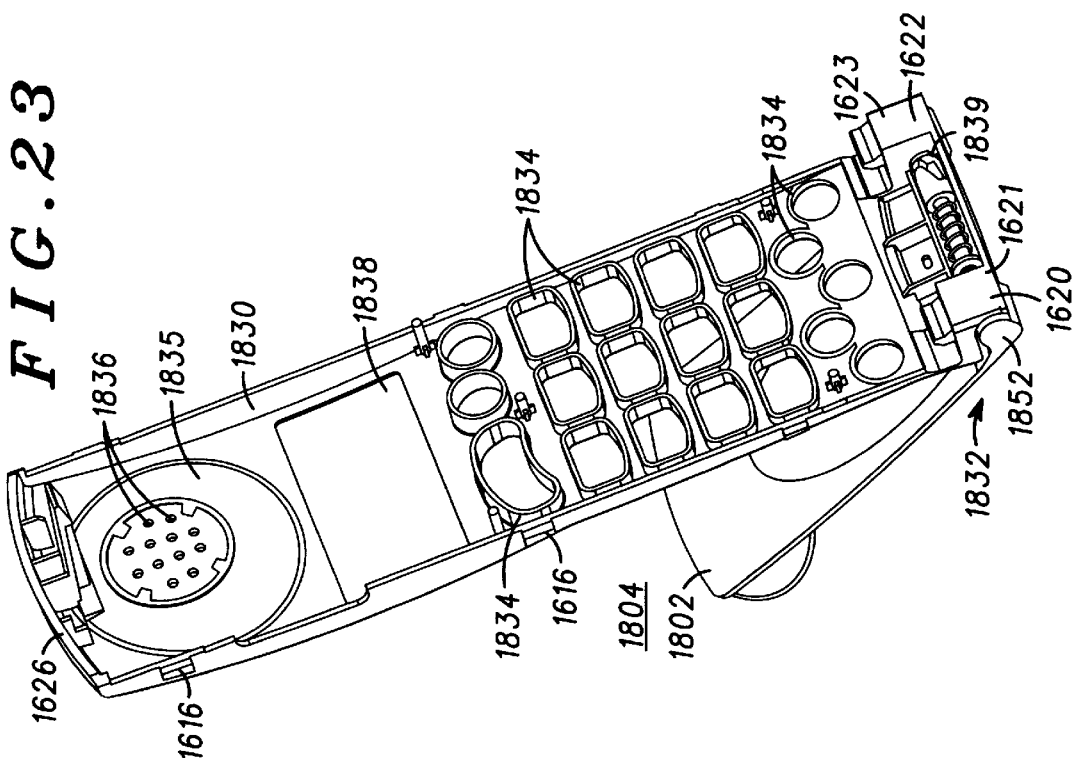
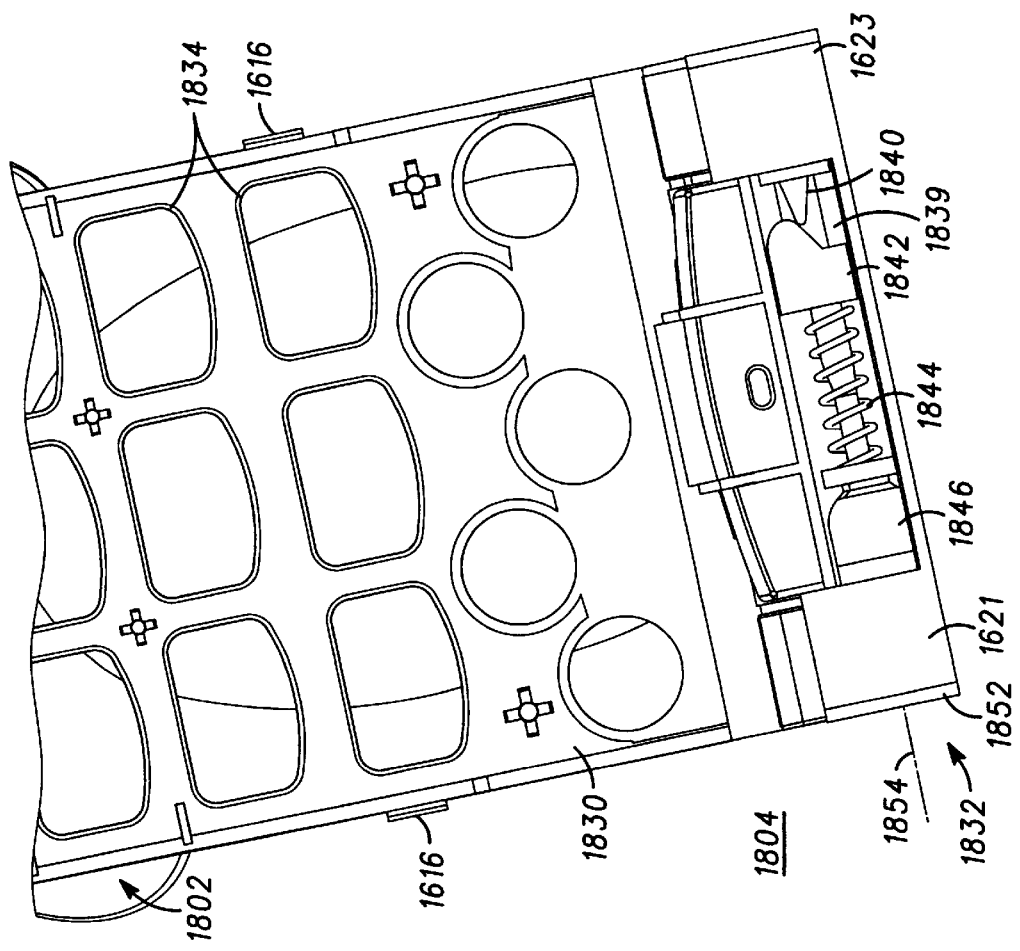

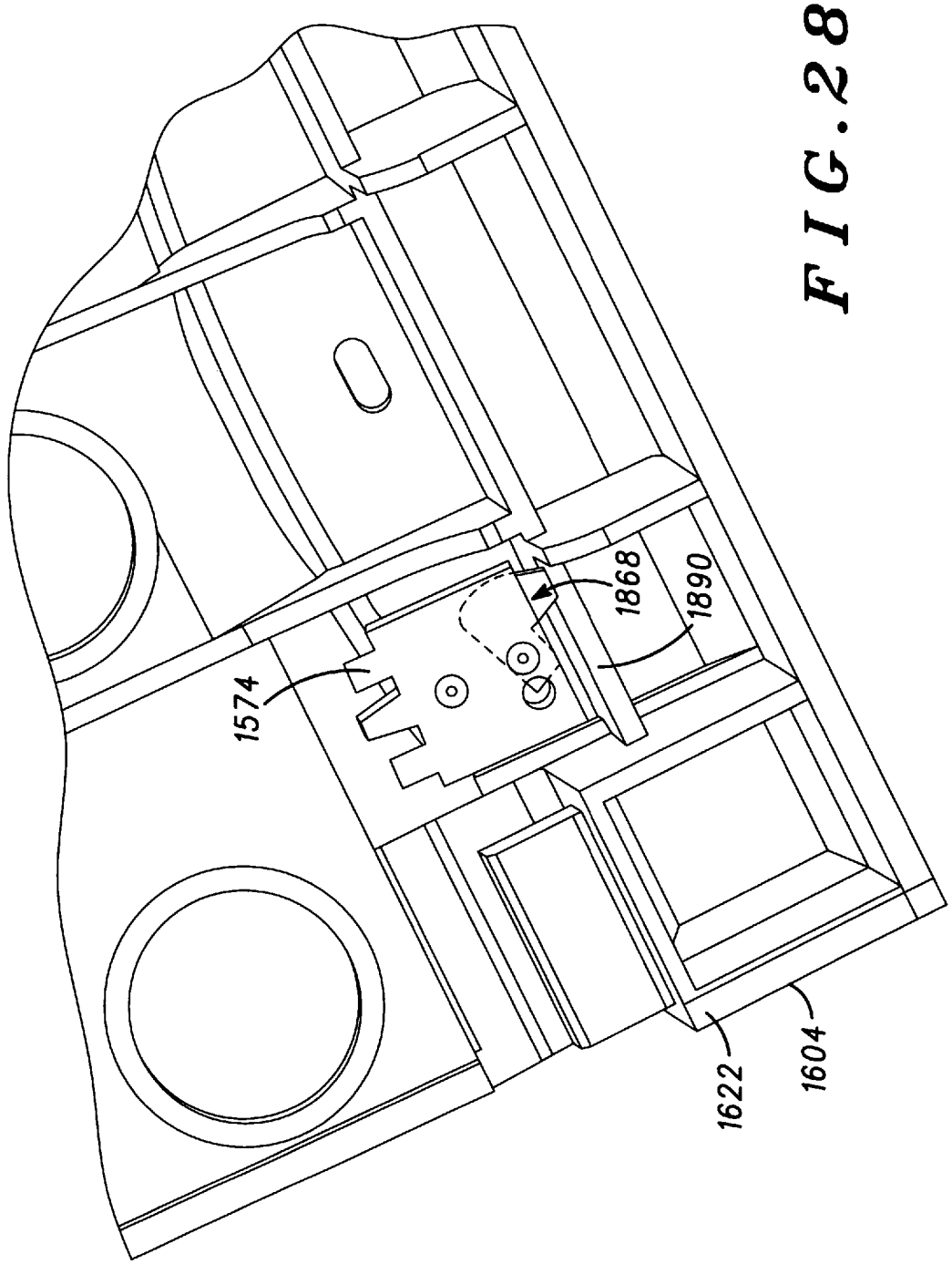

# 5,848,152

COMMUNICATION DEVICE HAVING INTERCHANGEABLE FACEPLATES AND ACTIVE KEYPAD COVER

CROSS REFERENCE TO RELATED APPLICATIONS

This is a continuation in part of application Ser. No. 08/742,379, filed on Nov. 1, 1996, which is a continuation in part of application Ser. No. 08/533,977, filed on Sep. 26, 1995, and is also a continuation in part of application Ser. No. 29/055,807, filed on May 2, 1996, U.S. Pat. No. D388,078, which is a continuation in part of application Ser. No. 29/046,799, filed on Oct. 18, 1995, U.S. Pat. No. D388,080.

FIELD OF THE INVENTION

The present invention generally relates to communication devices. More particularly, the present invention relates to a communication device such as a radiotelephone having interchangeable faceplates to provide a customized appearance.

BACKGROUND OF THE INVENTION

Portable communication devices are generally well-known in the art. Such portable communication devices include cellular telephones, cordless telephones and personal communicators. Communication devices traditionally communicate with a remote base station to provide wireless communications for a user. Communication devices have become a widely accepted form of wireless communications in the cordless and cellular radiotelephone markets.

Because of such wide acceptance, differentiating the appearance of individual portable communication devices has become an important requirement for the customer, the manufacturer, and the distributor of the communication device. Customers desire a unique appearance to satisfy their personal tastes and preferences. Manufacturers desire a unique appearance to provide a variety of appearances to their customers, and to provide a distinctive appearance for the manufacturer's own product. Distributors and retailers desire a unique appearance to differentiate themselves and their products in the marketplace and to promote their name brand. The desires of sellers and users to have a unique-looking portable communication device are communicated to the manufacturer so that the particular unique-looking portable telephone can be produced.

A communication device such as a radiotelephone is conventionally produced by assembling radiotelephone circuitry, including transceiver circuitry and user interface circuitry, within a housing. The user interface circuitry includes a display, a keypad, an earpiece and a microphone. The housing traditionally includes a rear housing, having a standard molded form, mated to a front housing having a different standard molded form. The front housing is adapted to provide a particular appearance by means of its molded contour, texture or color. Typically, the user interface elements are mounted inside the front housing and electrically connected to transceiver circuitry mounted in the back housing. The display and keypad may also each have a particular appearance. A particular front housing, a particular display and a particular keypad are selected by the manufacturer to give the portable radiotelephone an overall particular appearance.

A disadvantage of conventional production techniques for communication devices is the limited number of unique appearances available according to such techniques. The front and rear housings are standard in appearance and configuration. The same is true of keypads and displays. Only minimal variation has heretofore been possible. In fact, the need to keep manufacturing costs low has required the use of only standard elements which may be readily and rapidly assembled at minimum cost.

Some radiotelephones or communication devices have been developed having a particular faceplate or escutcheon which may be mounted to the housing. The escutcheon allows the appearance to be modified from the preexisting standard appearance.

One type of communication device has been developed which has a keypad cover. The keypad cover protects the keys of the keypad from inadvertent keypresses and keeps dirt and other contaminants from the keypad. In addition, in the open position, the keypad cover deflects sound waves from the user's mouth toward the microphone of the communication device and provides a more natural feel for a user of the communication device.

Some keypad covers are inactive in that they are merely movable appurtenances that provide no function other than that described above. However, active keypad covers have been developed which affect the operation of the communication device. For example, in one radiotelephone, the control switches of the radiotelephone are disabled when a keypad cover is closed. The on/off switch cannot be operated to turn the radiotelephone on or off and other switches are deactivated.

To date, no attempt has been made to provide a radiotelephone or other communication device having a customizable escutcheon or faceplate which also includes an active keypad cover. It would be desirable to provide such a communication device to permit a customized appearance in a device which also provides the convenience of an active keypad cover. Moreover, it would be desirable to provide interchangeable faceplates including a keypad cover having self-contained elements rather than many separable pieces which may be lost or misplaced during changeover of faceplates.

Accordingly, there is a need in the art for a communication device having interchangeable faceplate elements and an active keypad cover. Further, there is a need in the art for a faceplate having self-contained keypad components to make changeabllility of faceplates possible for the end user.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

FIG. 10 is an isometric view of a faceplate for use with the radiotelephone handset of FIGS. 9–10 showing a keypad cover in a closed position;

FIG. 11 is an isometric view of the faceplate of FIG. 10 showing the keypad cover in an open position;

FIG. 12 is a bottom view of the faceplate of FIG. 10;

FIG. 13 is a rear elevational view of the faceplate of FIG. 10;

FIG. 14 is a right side elevational view of the faceplate of FIG. 10;

FIG. 20 is a perspective view of a second faceplate for use with the radiotelephone of FIGS. 16 and 18, shown with the keypad cover in a closed position;

FIG. 21 is a perspective view of the second faceplate of FIG. 20, shown with the keypad cover in an open position;

FIG. 22 is a rear perspective view of the second faceplate of FIG. 20;

FIG. 23 is a detailed perspective view of a portion of FIG. 22;

FIG. 28 is a detail view of a portion of the first faceplate.

DETAILED DESCRIPTION OF A PREFERRED EMBODIMENT

Figure 1:
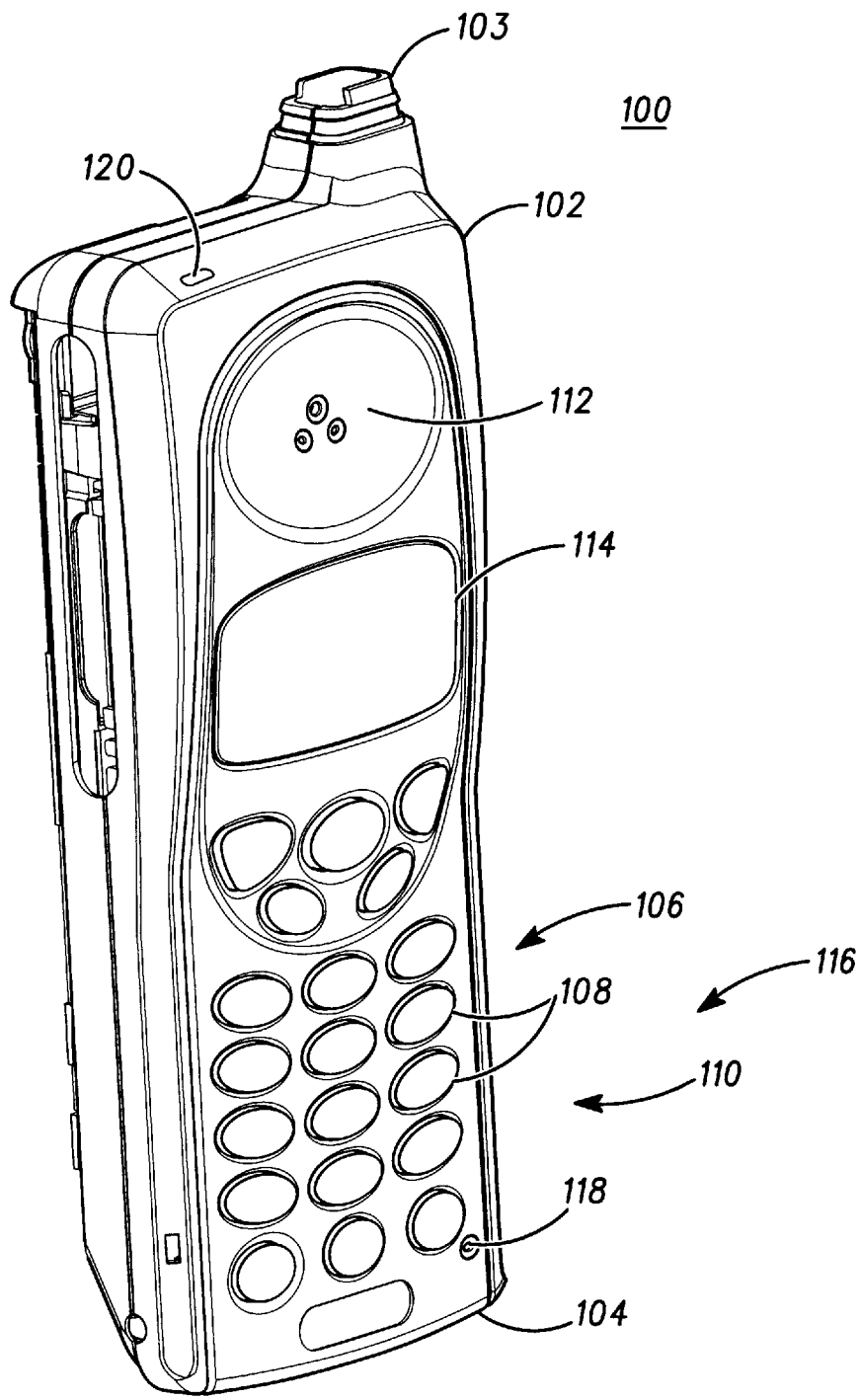
FIG. 1 is a first elevational view of a radiotelephone handset according to the present invention.

Referring now to FIG. 1, it shows a front elevational view of a radiotelephone handset 100 according to the present invention. The radiotelephone handset 100 generally includes a housing 102, a faceplate 104 and a keypad 106 having a plurality 108 of keys. In the preferred embodiment of the present invention, the radiotelephone handset 100 is a cellular radiotelephone handset for operation within a wide-area cellular network. Alternatively, the radiotelephone handset 100 may be a cordless radiotelephone handset, a personal communicator, or any other two-way communication device. The radiotelephone handset 100 is portable in that it is hand held by a user and is available for use virtually anywhere within its corresponding communication system. The handset 100 includes an antenna mount 103 adapted to receive an antenna permitting radio communication within the cellular network.

The radiotelephone handset 100 has a user interface 110 permitting the user to operate the radiotelephone handset 100. The user interface 110 of the radiotelephone handset 100 generally includes an earpiece interface 112, a display interface 114, a keypad interface 116 including the keypad 106, a microphone interface 118 and an alert interface 120. The user interface 110 operates in a conventional manner to provide the user with wireless communications.

According to the present invention, the radiotelephone handset 100 is adapted to accommodate a plurality of distinctive telephone appearances. In the preferred embodiment of the present invention, this is accomplished by the faceplate 104 having a distinctive user interface appearance. The distinctive user interface appearance is evidenced by the distinguished appearance, or unique look, that the faceplate gives to the earpiece interface 112, the display interface 114, the keypad interface 116, and the microphone interface 118. In the preferred embodiment, the distinctive appearance is accomplished by selecting the contour, shape, size, texture, material and color of the faceplate. Other ways to distinguish the appearance of the faceplate may be readily observable by those skilled in the art of industrial design, mechanical engineering or material engineering. Since the user of the radiotelephone handset 100 typically judges the appearance of the handset 100 based on the user interface 110, modification or replacement of the faceplate 104 provides a convenient way to substantially alter the appearance of the radiotelephone handset 100 with minimum expense and effort.

The housing 102 has a body appearance. In the preferred embodiment of the present invention, the body appearance is a conventionally molded housing having a standard appearance. The standard appearance of the housing 102 is not readily changeable other than surface appearance features such as texture and color and the like. The rationale for this is that the mechanical design of the radiotelephone handset 100 has been carefully designed in order to optimize the radiotelephone handset 100 for space, weight, styling, etc. including ergonomic factors such as the size and positioning of elements of the user interface 110 and the shape and contour of the handset 100. Altering the appearance of the housing 102 to any significant degree would require a substantial effort by the designers and producers of the radiotelephone handset 100.

The housing 102 is adapted to receive the faceplate 104 as one of a plurality of faceplates to provide the distinctive user interface appearance for the radiotelephone handset 100, thereby giving the handset 100 a distinctive telephone appearance. The benefit thus provided is that the handset 100 can easily change appearances simply by attaching different faceplates such as faceplate 104. Therefore, any one of a plurality of faceplates such as faceplate 104 may be readily received by the housing 102 to give the handset 100 a distinguished appearance. Further advantages and features of the present invention will be described in more detail below with reference to FIGS. 2 through 7.

Figure 2:
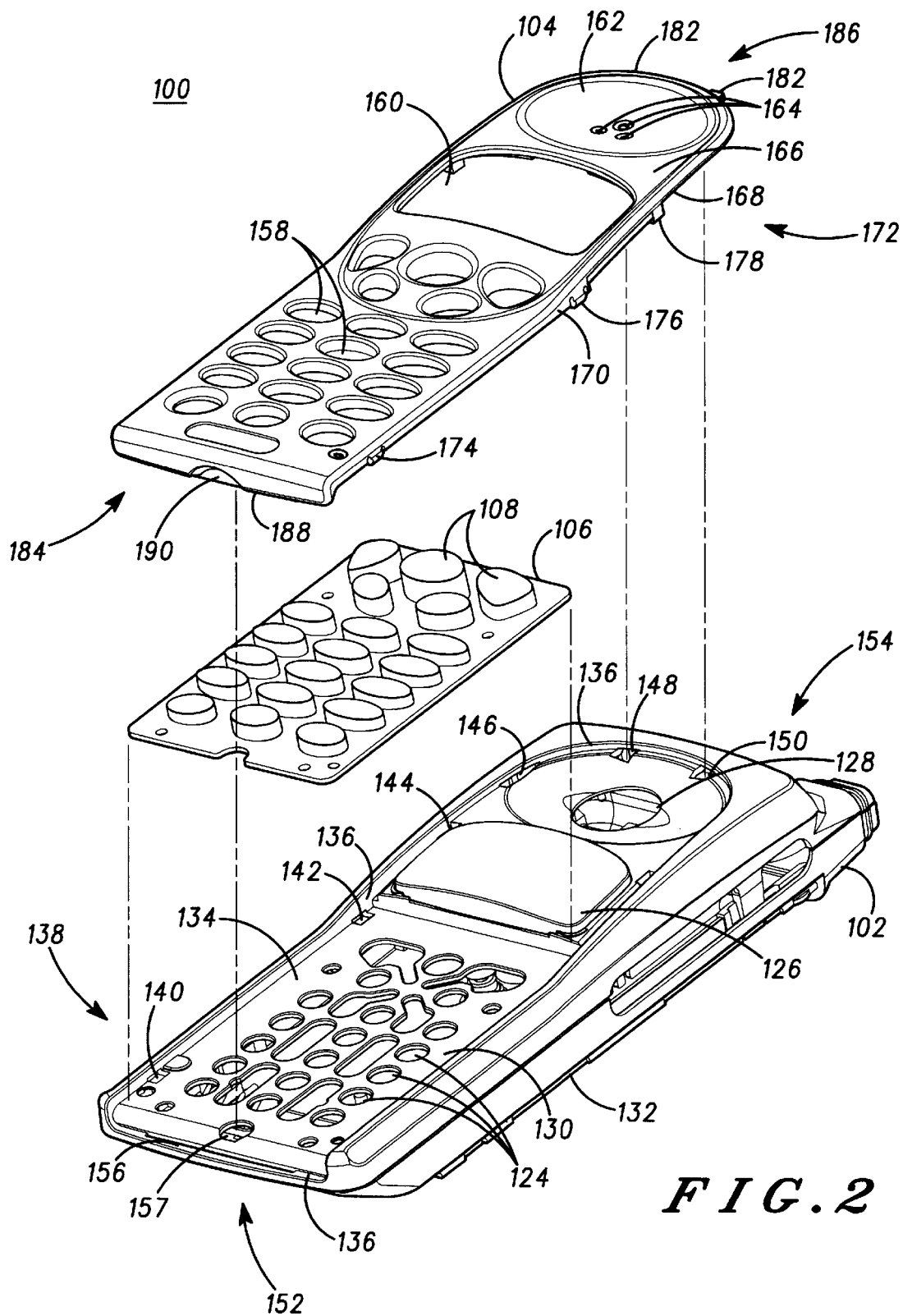
FIG. 2 is a first exploded view of a radiotelephone view of the radiotelephone handset of FIG. 1.

FIG. 2 is a first exploded view of the radiotelephone handset 100 of FIG. 1. The radiotelephone handset 100 of FIG. 2 generally illustrates the housing 102, a keypad 106 and the faceplate 104. In a typical embodiment, the housing 102 contains control circuitry (not shown) providing the operational capabilities of a portable telephone such as a radiotelephone.

The housing 102 includes a plurality 124 of keypad holes, a display lens 126 and an earpiece hole 128. The plurality 124 of keypad holes form a part of the keypad interface 116 and permits electrical and mechanical contact between the individual keys 108 of the keypad 106 and the control circuitry contained within the housing 102. The display lens 126 has a particular appearance and forms a part of the display interface 114 and permits viewing of and protects a display (not shown) controlled by the control circuitry within the housing 102. In the preferred embodiment, the display lens 126 is affixed to the housing 102. In alternative embodiments, the display lens 126 is detachable and may be substituted with another display lens having a different particular appearance. The earpiece hole 128 forms a part of the earpiece interface 112 and permits acoustic coupling between the user's ear and a speaker contained within the housing 102.

The housing 102 includes a front face 130 and a rear face 132. The front face 130 preferably includes a recessed portion 134 defined by a perimeter 136. The front face 130 further includes one or more slots 138. Preferably, the one or more slots 138 include a slot 140, slot 142, slot 144, slot 146, slot 148 and slot 150. Also preferably, the one or more slots 138 includes other slots not visible in FIG. 2 arranged symmetrically with slots 140, 142, 144 and 146 on the front face 130 of the housing 102. The housing 102 has a first end 152 and a second end 154. At the first end 152, the housing 102 preferably includes a slot 156. In accordance with the present invention, the housing 102 includes an aperture 157 at the first end 152. As will be described further in conjunction with FIG. 3, the aperture 157 is adapted to receive a latch pin located on the faceplate 104 for securing the faceplate 104 to the housing 102.

The keypad 106 includes a plurality of keys 108 having a distinctive key appearance. In the preferred embodiment, the keypad 106 is securely attached to the housing 102 as part of the manufacturing process. However, in alternative embodiments, the keypad is detachable from the housing, permitting replacement with another keypad having a different distinctive key appearance.

The faceplate 104 preferably includes a plurality 158 of keyholes, a lens aperture 160 and an ear cup 162. The plurality 158 of keyholes provides tactile access to the keys 108 of the keypad 106 for the user of the radiotelephone handset 100. Each of the keyholes of the plurality 158 of keyholes is sized to accommodate one of the keys 108 of the keypad 106. Similarly, the lens aperture 160 is sized to accommodate the display lens 126 affixed to the housing 102. In this manner, the lens aperture 160 permits easy viewing of the display lens 126. The ear cup 162 includes a plurality 164 of ear holes. The ear holes permit acoustic coupling between the earpiece hole 128 of the housing 102 and the user's ear. The ear cup 162 is preferably contoured to maximize acoustic coupling.

The faceplate 104 has an outer surface 166, an inner surface 168 and a perimeter 170. Extending from the inner surface 168 along the perimeter 170, the faceplate 104 includes one or more tabs 172 including tabs 174, 176, 178, 180 and 182. Also preferably, the one or more tabs 172 includes tabs not visible in FIG. 2 arranged symmetrically with tabs 174, 176, 178 on the inner surface 168 of the faceplate 104. The faceplate 104 has a first end 184 and a second end 186. Extending from the inner surface 168 of the faceplate 104 at the first end 184 is a tongue 188. The faceplate 104 preferably includes a finger slot 190.

The faceplate 104 may be removable attached to the housing 102 by inserting the one or more tabs 172 into corresponding slots of the one or more slots 138 in a snap-fit connection. Similarly, the tongue 188 of the faceplate 104 may be inserted in the slot 156 at the first end of the housing 102. By engagement of the one or more tabs 172 extending from the faceplate 104 with the one or more slots 138 in the housing 102, the faceplate 104 is maintained snugly against the front face 130 of the housing 102. The perimeter 170 of the faceplate 104 is configured to conform to the perimeter 136 of the recessed portion 134 of the front face 130 of housing 102. In this manner, the housing 102 receives the faceplate as one of a plurality of faceplates to provide a distinctive user interface appearance for the radiotelephone handset, thereby giving the radiotelephone handset one distinctive telephone appearance of a plurality of distinctive telephone appearances.

Figure 3:
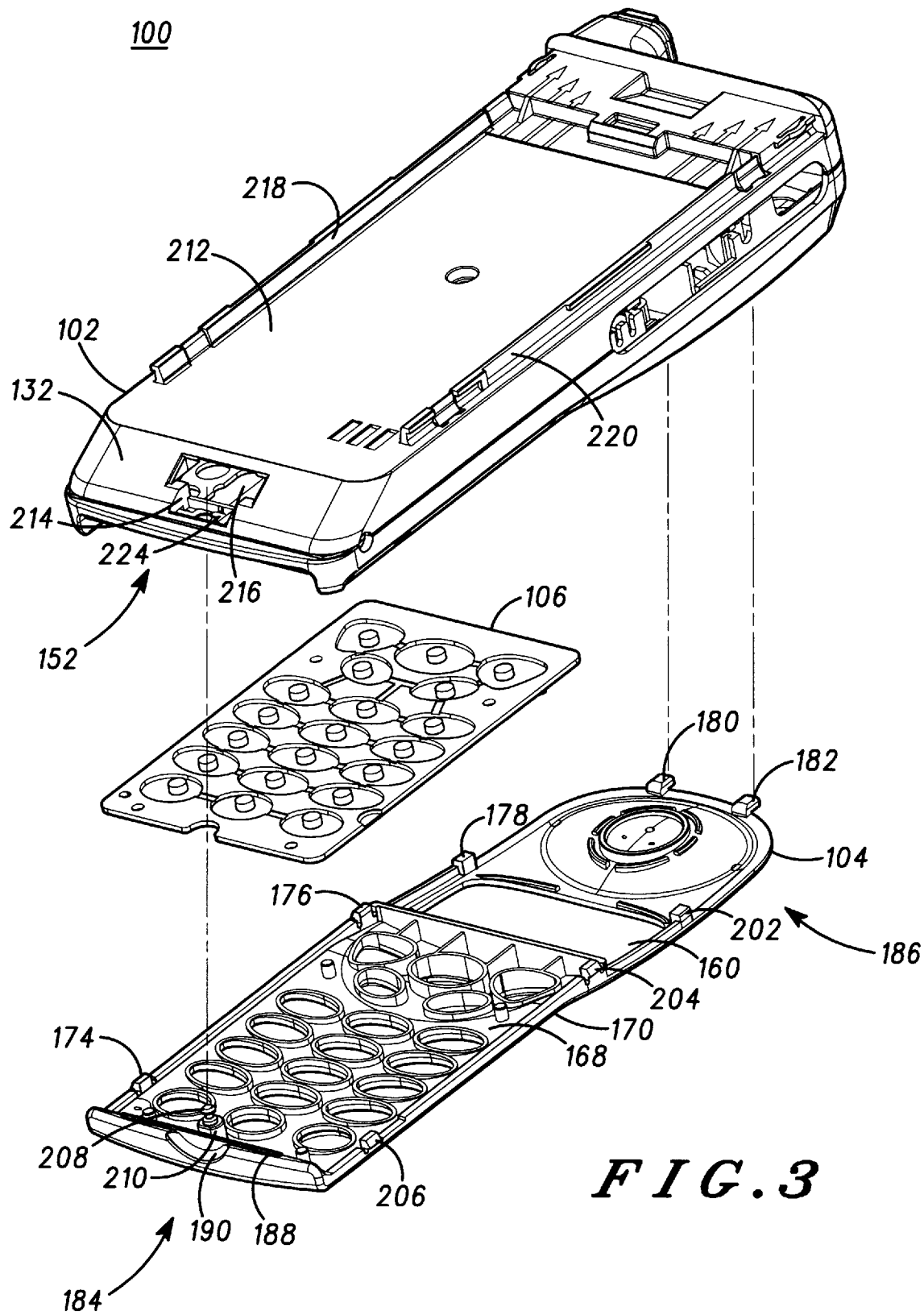
FIG. 3 is a second exploded view of the radiotelephone handset of FIG. 1.

Referring now to FIG. 3, it shows a second exploded view of the radiotelephone handset 100 of FIG. 1. FIG. 3 further illustrates the housing 102, the faceplate 104 and the keypad 106. In FIG. 3, the one or more tabs 172 arranged along the inner surface 168 of the faceplate 104 are visible. As shown in FIG. 2, the one or more tabs 172 include tabs 174, 176, 178, 180 and 182. In FIG. 3, the one or more tabs 172 also includes tabs 202, 204 and 206.

As is further illustrated in FIG. 3, the faceplate 104 includes a latch pin 208 extending from the inner surface 168. In the preferred embodiment, the faceplate 104 includes a post 210 located on the inner surface 168 at the first end 184. Preferably, the post 210 is a molded portion of the faceplate 104. The post 210 includes an aperture configured to receive the latch pin 208 and securely retain the latch pin 208 by friction, adhesive or other means. Alternatively, the latch pin 208 may be integrally formed with the faceplate 104, as by injection molding, or by any other appropriate method.

The housing 102 includes a battery receiving portion 212, a channel 214 and a receptacle 216. The radiotelephone handset 100 generally includes control circuitry contained within the housing 102 which operates in response to electrical power provided by a battery (not shown). The housing 102 is configured to securely receive the battery attached to the rear face 132 at the battery receiving portion 212. To secure the battery to the rear face 132, the battery receiving portion 212 includes slide rails 218 and 220. The housing includes contact apertures 222 for permitting electrical contact between the battery and the control circuitry contained within the housing. The receptacle 216 is configured to receive a plug (not shown) which provides electrical contact to the control circuitry of the handset 100, for example, for recharging the battery or for providing operating power from an AC adapter.

The rear face 132 of the housing 102 further includes a channel 214 at the first end 152. Recessed within the channel 214 is a latch keeper 224. As will be discussed further in conjunction with FIGS. 4–7, the latch keeper 224, is configured to releasably engage the latch pin 208 to securely retain the faceplate 104 as a unitary assembly with the housing 102.

Figure 4:
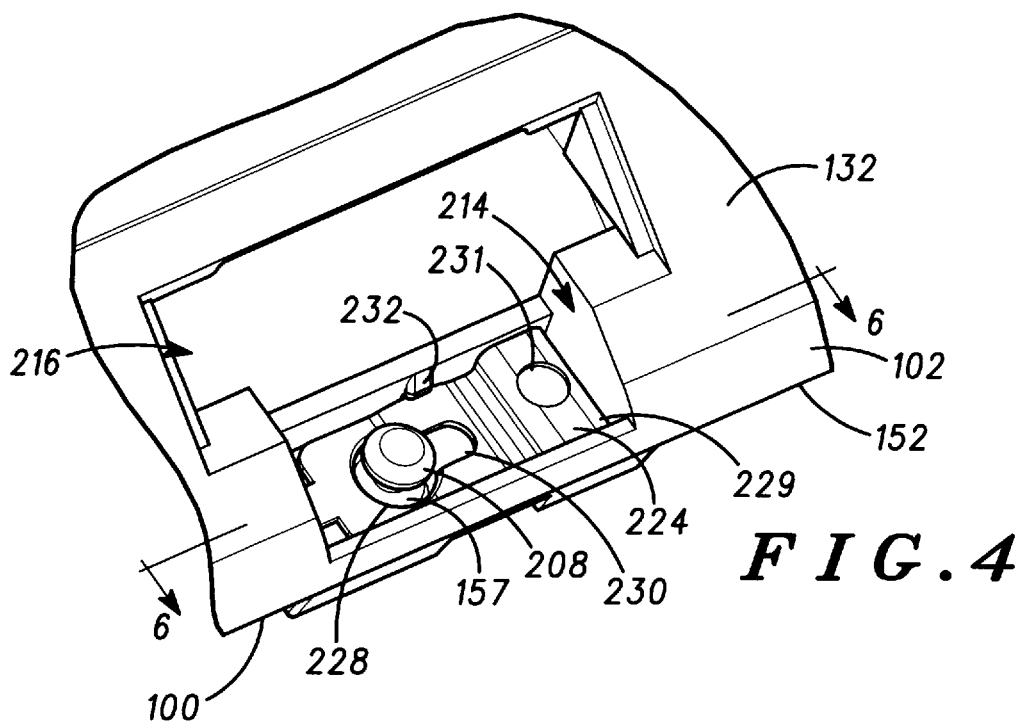
FIG. 4 is a first detail view of a portion of the radiotelephone handset of FIG. 1.

Referring now FIG. 4, it shows a first detailed view of a portion of the radiotelephone handset 100 of FIG. 1. In FIG. 4, the channel 214 is formed in the rear face 132 of the housing 102. Recessed within the channel 214 is the latch keeper 224. The latch keeper is preferably formed from metal or other suitably strong, rigid material.

The latch keeper 224 preferably includes a substantially flat arm 226 having a first aperture 228 and a second aperture 230 and an upright portion 229 having a third aperture 231.

When the housing 102 receives the faceplate 104, the latch pin 208 extends through the aperture 157 (not shown) in the front face 130 of the housing 102. The first aperture 228 of the latch keeper 224 is sized to receive a portion of the latch pin 208 when the latch pin extends through the aperture 157. The second aperture 230 is contiguous with the first aperture 228 and sized to retain the portion of the latch pin 208.

Figure 5:
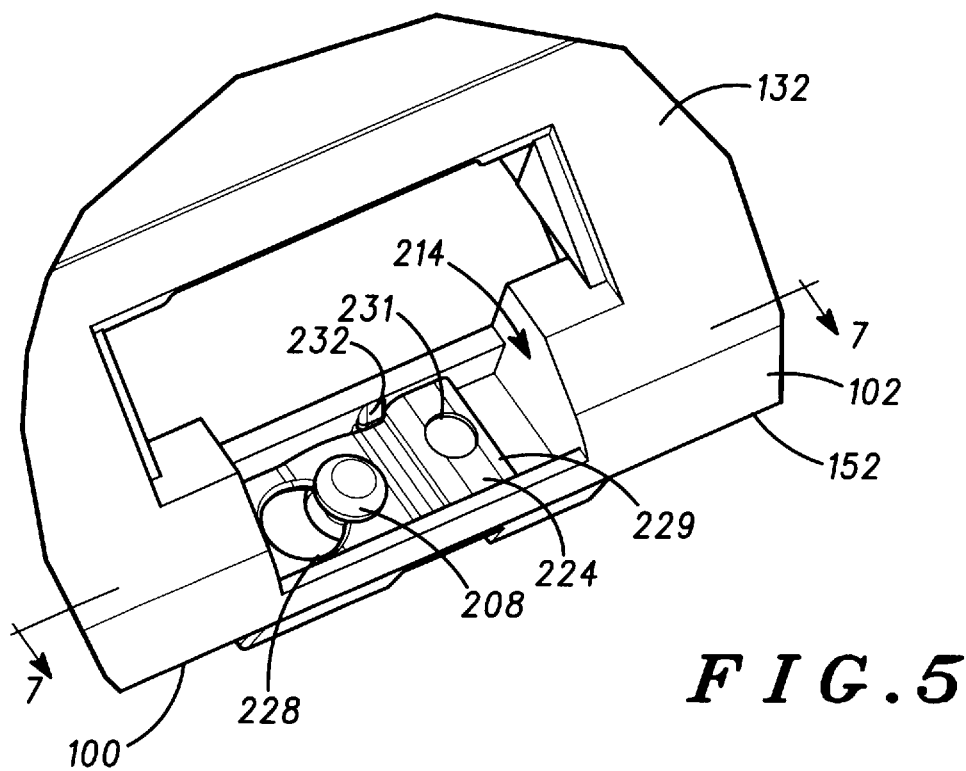
FIG. 5 is a second detail view of a portion of the radiotelephone handset of FIG. 1.

FIG. 5 is a second detailed view of a portion of the radiotelephone handset 100 of FIG. 1. According to the present invention, the latch keeper is slideable between a release position illustrated in FIG. 4 and a lock position illustrated in FIG. 5. In FIG. 5, the latch keeper 224 has been moved from the position illustrated in FIG. 4 in order to securely engage and retain the latch pin 208. In the release position, the first aperture 228 aligns with the aperture 157 in the housing 102 (FIG. 2) to receive the latch pin inserted through the aperture 157. In the lock position, the second aperture 230 aligns with the aperture 157. The third aperture 231 is configured to receive the tip of a pen, pencil or other instrument to facilitate sliding the latch keeper 224 between the lock position and the release position.

As can be seen in FIGS. 4 and 5, the channel 214 includes one or more retainers, such as retainer 232. Retainer 232 retains the latch keeper 224 in the channel 214 while permitting sliding movement between the release position for releasing the latch pin 208 (FIG. 4) and the lock position for locking the latch pin 208 (FIG. 5). The latch pin 208 and the latch keeper 224 form a latch 209. It will be understood by those skilled in the art that the latch 209 could be formed using different elements which still provide the function of securing the faceplate 104 to the housing 102.

Figure 6:
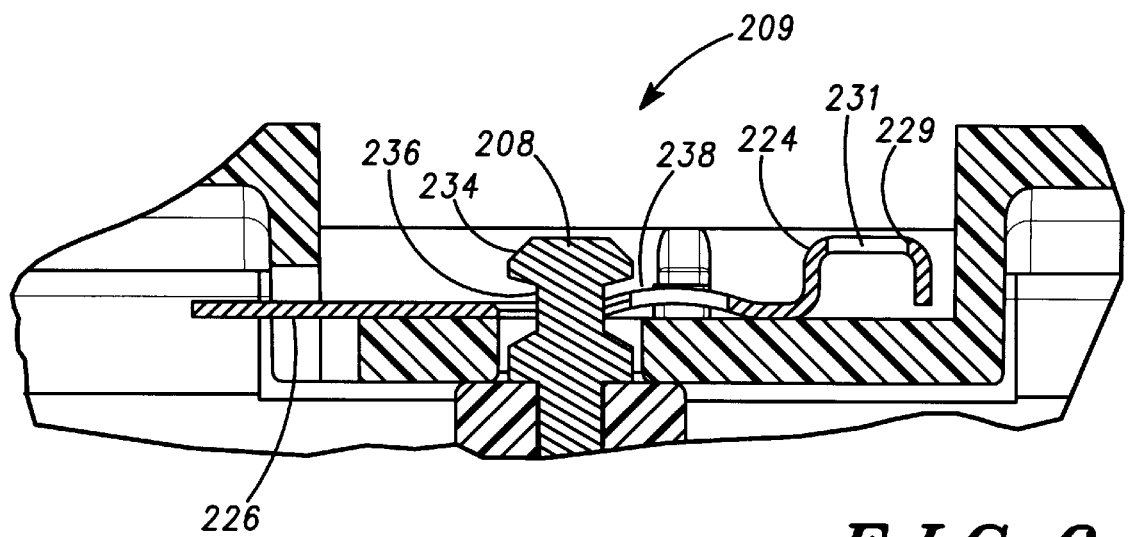
FIG. 6 is a cross-sectional view taken along line 6–6' in FIG. 4.
Figure 7:
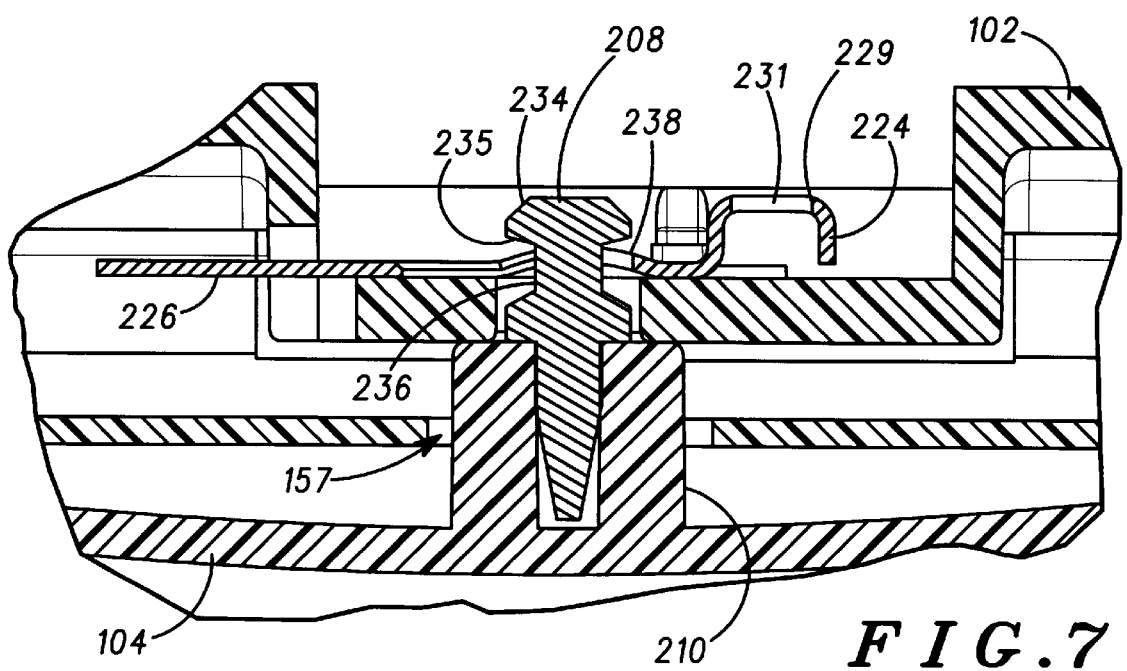
FIG. 7 is a cross-sectional view taken along line 7–7' in FIG. 5.

FIG. 6 is a cross-sectional view taken along line 6–6' in FIG. 4. FIG. 7 is a cross-sectional view taken along line 7–7' in FIG. 5. In FIGS. 6 and 7, it can be seen that the latch pin 208 includes a cap 234 having a seat portion 235 and a neck 236. The neck has a neck diameter and the cap has a cap diameter. The cap diameter is larger than the neck diameter so that when the latch keeper 224 is in the latched position (FIGS. 5 and 7) the neck 236 is engaged by the second aperture 230 to retain the latch pin 208 within the latch keeper 224.

Preferably, substantially flat arm 226 of the latch keeper 224 includes an arcuate portion 238. The arcuate portion 238 is preferably slightly flexible as may be achieved if the latch keeper 224 is fabricated from a flexible material, such as thin metal. When the latch keeper 224 is moved to the lock position (FIG. 7), the arcuate portion 238 engages the seat portion 235 of the cap 234 of the latch pin 208. In this manner, the arcuate portion 238 forms a bias element for asserting a bias force between the latch pin 208 and the housing 102 when the latch keeper 224 is in the lock position. This bias force serves to snugly retain the latch pin 208 and to prevent the latch keeper 224 from inadvertently sliding from the locked position to the release position (FIG. 6).

With the latch keeper 224 in the locked position, the faceplate 104 will remain secured to the housing 102, even if the handset 100 is dropped or otherwise jarred. The latch 209 formed by the latch pin 208 and the latch keeper 224 operates to additionally retain the faceplate 104 to the housing 102, supplementing the mechanical connection provided by the one or more tabs 172 and the one or more slots 138. Unlike the apparatus provided by a tab-and-slot retainer, the latch 209 is a configurable latch in that it may be moved between a release configuration and a lock configuration. In the release configuration, the faceplate 104 may be readily removed and replaced. In the lock configuration, the faceplate 104 is secured to the housing 102.

Since the faceplate 104 and the keypad 106 may be attached to the housing 102 at various points in time throughout the distribution chain, it is conceived that the faceplate 104 alone or in combination with the keypad 106 may be sold as a user interface kit. Such a kit would be available to the user for a specific selection at a distribution outlet, a retail store, or by mail order, thereby allowing the user to initially use a distinctive appearance or to change the faceplate and choose another distinctive appearance at a later time.

Figure 8:
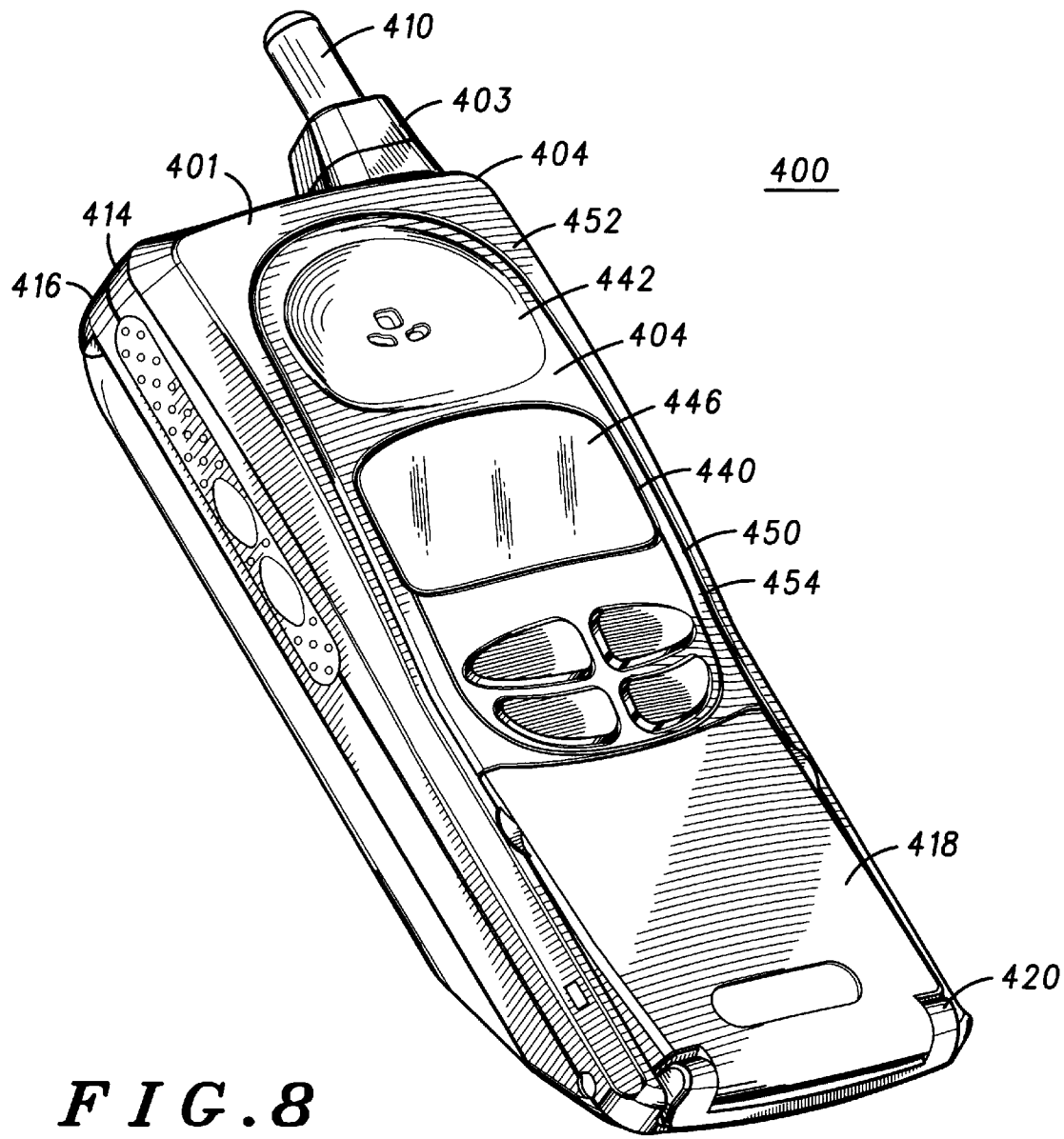
FIG. 8 is a first elevational view of an alternative embodiment of the radiotelephone handset of FIG. 1.
Figure 9:
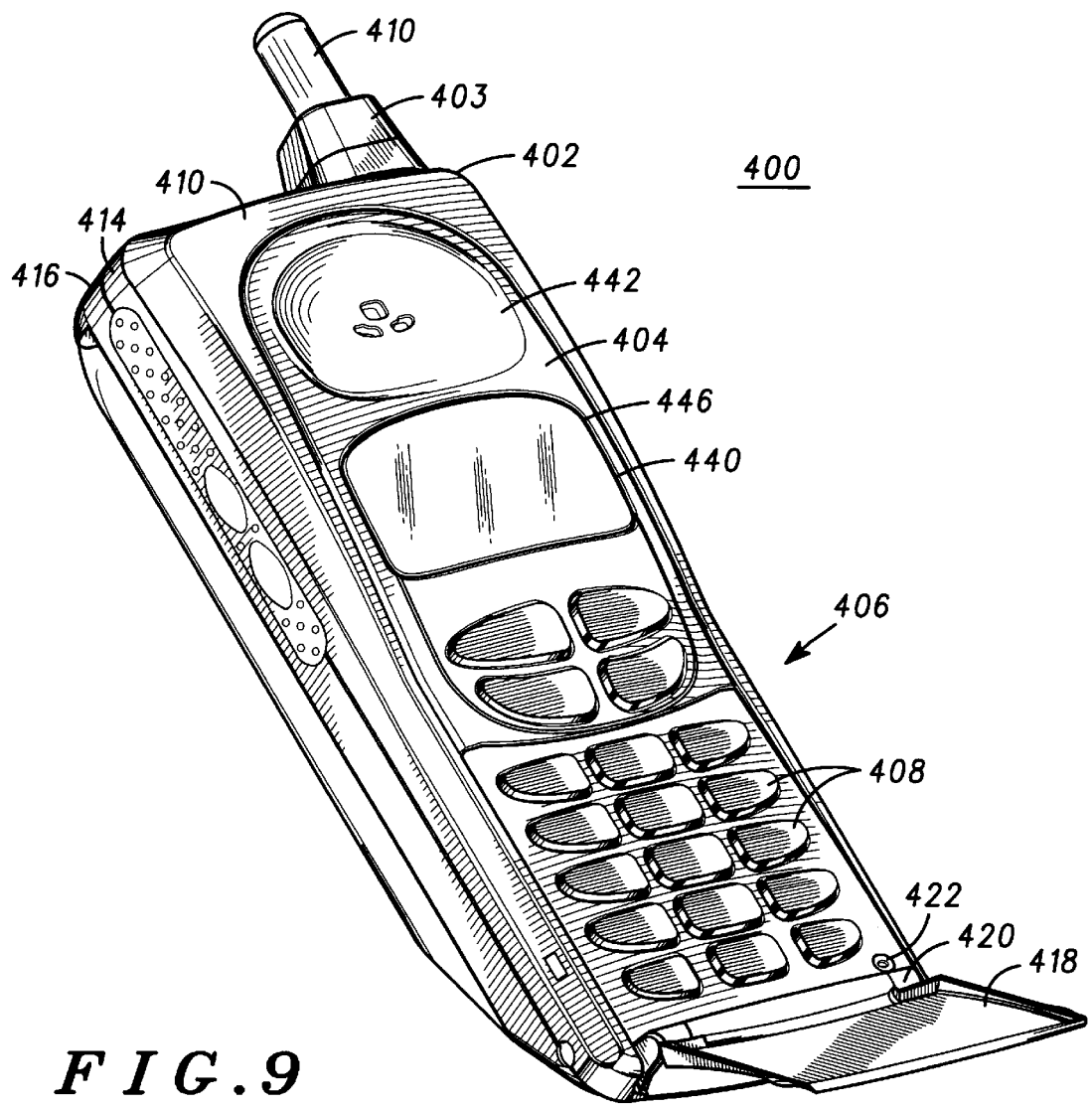
FIG. 9 is a second elevational view of the alternative embodiment of the radiotelephone handset of FIG. 8.

Referring to FIGS. 8–9, they show a second embodiment of the radiotelephone handset 400. The radiotelephone handset 400 generally includes a housing 402 having a front face 401, a faceplate 404 and a keypad 406 disposed on the front face of the housing, the keypad 406 having a plurality 408 of keys. The handset 400 includes an antenna mount 403 adapted to receive an antenna 410 permitting radio communication within a cellular network. The housing 402 includes a front housing portion 414 and a rear housing portion 416. The housing 402 illustrated in FIGS. 8–9 is substantially identical to the housing illustrated in FIGS. 1–7. The radiotelephone handset 400 comprises a portable radio configured for radio communication with a remote transceiver.

In accordance with the present invention, the radiotelephone handset 400 includes a keypad cover 418 movable between a first position (FIG. 8) and a second position (FIG. 9). The keypad cover 418 covers a portion of the keypad 406 in the first position and the keypad cover 418 exposes a portion of the keypad 406 in the second position. Alternatively, the keypad cover 418 may be extended to cover a portion of the front housing in the first position. Thus, the keypad cover 418 covers one of a portion of the faceplate 404 and the front housing portion in the first position.

The radiotelephone handset 400 further comprises a hinge 420 for rotational movement of the keypad cover 418 between the first position and the second position. In the illustrated embodiment, the hinge 420 rotatably couples the keypad cover 418 to the faceplate 404 and the keypad cover 418 and hinge 420 are integrally formed with the faceplate 404. However, the hinge 420 could be located in other suitable locations, such as in a position coupling the keypad cover 418 to the front housing portion 414.

In the illustrated embodiment, the keypad cover 418 comprises a hinged flap which covers the keys 408 of the keypad 406 in the first position. However, it is to be understood that other types of keypad covers, such as those which move in a translational direction, may be substituted for the illustrated embodiment.

The keypad cover 418 provides additional user convenience not available in other radiotelephone handsets, such as the embodiment illustrated in FIG. 1. For example, a user may close the keypad cover by moving it from the second position to the first position. In the first position, the keys 408 are protected from inadvertent actuations. Also, the keys 408 are protected from water, dirt and other contaminants when the keypad cover 418 is in the first position. When the keypad cover 418 is open, or in the second position, the keypad cover 418 operates to direct sound waves from the user's mouth toward a microphone 422 located on the front face 401. The keypad cover 418 also operates to shield a portion of the user's face, including the mouth, when in the second position, thereby providing the user with a feeling of privacy when speaking during a phone call.

Referring to FIGS. 10–14, the faceplate 404 includes a body 428 configured for removable attachment to the housing 402 of a communication device such as the radiotelephone handset 400 and a keypad cover 418 movably coupled to the body 428. Alternatively, the keypad cover 418 may be omitted from the faceplate 404 and form a separate element. The faceplate 404 has a first end 430 and a second end 432. The faceplate 404 further includes a hinge 420 disposed at the first end 430 of the body 428 coupling the keypad cover 418 to the faceplate 404 to provide rotational movement of the keypad cover 418 between the first position and the second position.

The faceplate 404 includes an outer surface 434 and an inner surface 436 and a perimeter 435. The outer surface 434 defines a plurality of keyholes 438. Each keyhole is sized to receive a key 408 of the keypad 406 when the faceplate 404 and the keypad 406 are attached to the housing 402. In FIGS. 10–13, the faceplate 404 is shown with the keypad 406 engaging the faceplate 404.

The faceplate 404 preferably includes an aperture 440, an ear cup 442 and a microphone aperture 444. The housing 402 includes a display lens 446 (FIG. 9). The aperture 440 is sized to accommodate the display lens when the faceplate 404 is attached to the housing 402. The ear cup 442 includes a plurality 448 of ear holes which permit acoustic coupling between earpiece hole 128 (FIG. 2) of the housing 402 and the user's ear.

The front face 401 of the housing 402 defines a recessed portion 450 and a non-recessed portion 452, separated by a perimeter 454. The recessed portion 450 is sized and shaped to receive the faceplate 404, thereby providing a substantially flush fit between the outer surface 434 of the faceplate 404 and the non-recessed portion 452. Similarly, the outer surface 434 of the faceplate 404 defines a recessed portion 456 and a non-recessed portion 458 (FIG. 11). The recessed portion 456 is sized to receive the keypad cover 418 when the keypad cover 418 is in the first position, thereby providing a substantially flush fit between the keypad cover 418 and the non-recessed portion 458 of the outer surface 434. The flush fit between the keypad cover 418 and the faceplate 404 and between the faceplate 404 and the housing 402 ensure a smooth, attractive appearance. Of course, other appearances and design choices may also be accommodated.

Preferably, the faceplate 404 is configured for removable attachment to the front housing portion 414. To provide this capability, the faceplate has tabs 460, 462 at the second end 432 which are insertable into corresponding slots 148, 150 of the housing 102 (FIG. 2). Further, the faceplate 404 preferably includes a post 464 located in the inner surface 436 and a latch pin 466 extending therefrom. The latch pin 466 is positioned to engage a latch keeper such as latch keeper 224 of the housing 402 (FIG. 3) to securely retain the faceplate on the front face 401 of the housing 402. Thus, the radiotelephone handset includes a configurable latch for releasably securing the faceplate to the housing, the configurable latch including the latch pin 466 and the latch keeper 224. In alternative embodiments, the configurable latch may be omitted and the faceplate 404 retained on the housing 402 by snap fitting or by other means. Also, the faceplate 404 may be permanently attached to the housing 402 at the time of manufacture, with the faceplate chosen to customize the appearance of the radiotelephone handset 400 when assembled with the standard housing 402.

It is envisioned that the radiotelephone handset 400 may be provided to a user in a complete package. As packaged, the radiotelephone handset 400 includes a standard housing, such as housing 402, having a standard appearance, a keypad configured to be disposed on the front face 401 of the housing 402, and a plurality of faceplates such as faceplate 404 and faceplate 104 (FIG. 2). Each faceplate is configured for removable attachment to the front face of the standard housing 402 for customizing the appearance of the radiotelephone handset 400. At least one faceplate of the plurality of faceplates, such as faceplate 404, has a keypad cover 418 movable between a first position and a second position. The keypad cover 418 covers a portion of the keypad in the first position and exposes a portion of the keypad in the second position. In their profile, each faceplate is identical to make them interchangeable. Each faceplate has an outer perimeter 435 configured to conform to the perimeter 454 of the recessed portion 450 of the housing 402.

From the foregoing, it can be seen that the present invention provides a radiotelephone handset adapted to accommodate a plurality of distinctive telephone appearances. The handset includes a housing adapted to receive a faceplate as one of a plurality of faceplates to provide a distinctive user interface appearance for the handset. The faceplate includes a latch pin extending from an inner surface to be engaged by a latch keeper located on the radiotelephone housing. The latch keeper allows the faceplate to be snugly retained against the housing or to be released and exchanged with another faceplate. A kit including the faceplate and a keypad for the radiotelephone handset may be separately combined and sold to provide an alternative user interface appearance for the handset.

Figure 15:
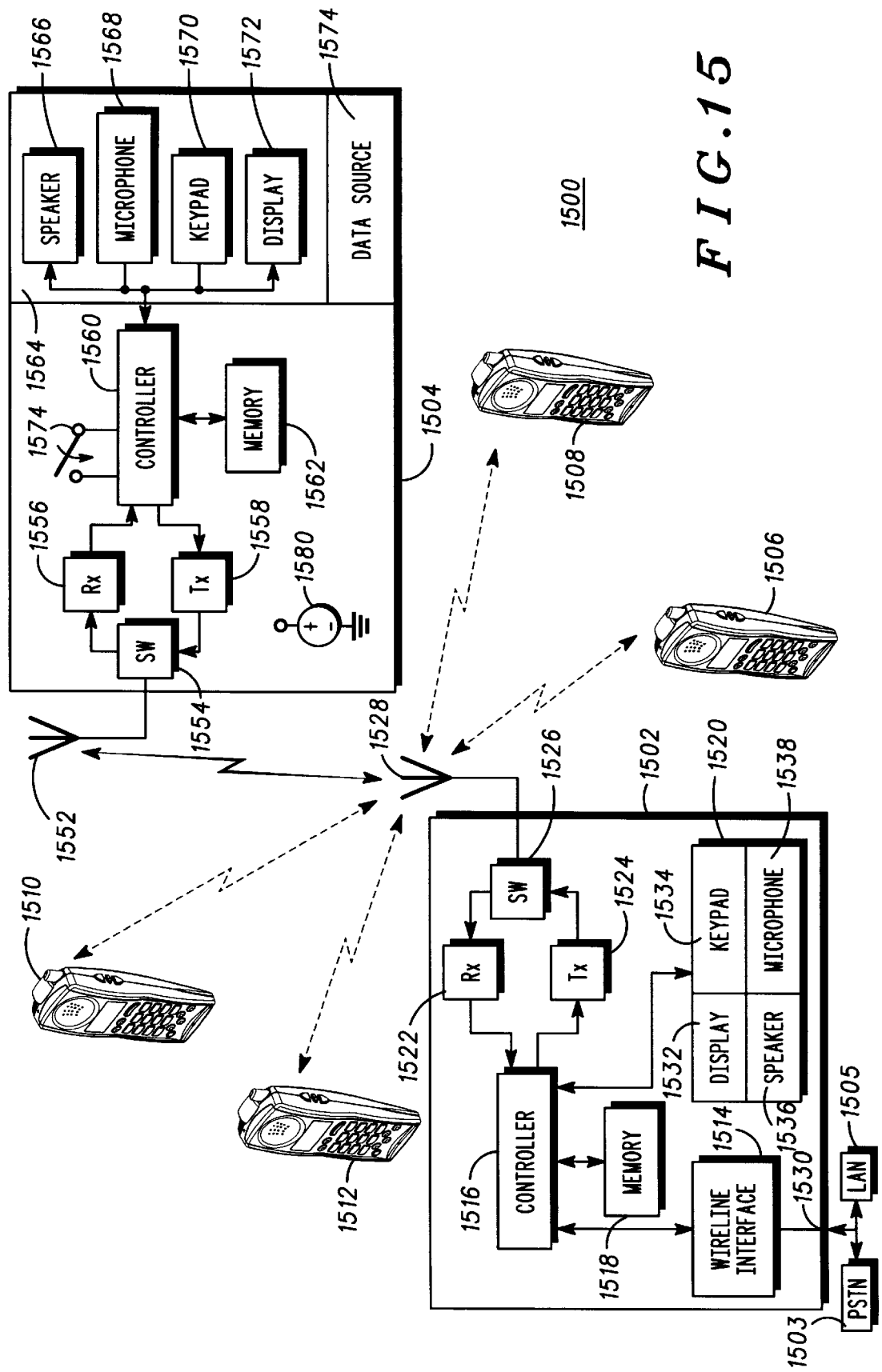
FIG. 15 is an operational block diagram of a radiotelephone system.

Referring now to FIG. 15, a radiotelephone system 1500 includes a base station 1502 and a plurality of radiotelephones, such as radiotelephone 1504, radiotelephone 1506, radiotelephone 1508, radiotelephone 1510 and radiotelephone 1512. The radiotelephone system 1500 is a cordless telephone system, cellular system or any similar wireless communication system. The radiotelephone system 1500 includes any number of radiotelephones and the number illustrated in FIG. 15 is arbitrarily chosen to illustrate one embodiment of such a system. The radiotelephone system 1500 is configured for radio communication between the base station 1502 and each of the plurality of radiotelephones. Radio communication occurs according to a standard protocol. Examples of such a standard protocol include the Digital European Cordless Telephone (DECT) protocol or the Personal Handy Phone system (PHS) protocol.

In the illustrated embodiment, the base station 1502 provides an interface between radio communication with the plurality of radiotelephones and wire line communication with a telephone network. The base station 1502 includes a wire line interface 1514, a controller 1516, a memory 1518, a user interface 1520, a receive circuit 1522, a transmit circuit 1524, an antenna switch 1526 and an antenna 1528. The wire line interface 1514 is coupled to an input 1530 which is configured for coupling to a telephone network. The wire line interface 1514 provides functions such as tone generation for dual tone, multiple frequency (DTMF) dialing and detection of an incoming ringing signal from the telephone network. The wire line interface 1514 also communicates signals representative of speech between the telephone network and the controller 1516.

The controller 1516 controls the operation of the base station 1502. The user interface 1520 includes a display 1532, a keypad 1534, a speaker 1536 and a microphone 1538. The receiver circuit 1522 and the transmitter circuit 1524 provide radio communication for the base station with one or more radiotelephones of the plurality of radiotelephones. Upon reception of RF signals, the base station 1502 receives radio frequency (RF) signals through the antenna 1528. The antenna 1528 converts the RF signals into electrical baseband signals. The receiver circuit 1522 demodulates the electrical baseband signals, recovers the data transmitted on the RF signals and produces a serial data stream. This serial data stream is converted to clocked data and is provided to the controller 1516. The controller 1516 formats the data into recognizable voice or information for use by the user interface 1520 or for transmission to the wire line interface 1514. The user interface 1520 communicates the received information or voice to a user. Similarly, the wire line interface 1514 communicates the received information or voice to the telephone network.

Upon transmission of radio frequency (RF) signals from the base station 1502, the controller 1516 receives user input data from the user interface 1520 and receives wire line information from the wire line interface 1514. The controller 1516 formats the information obtained from the user interface 1520 and conveys it to the transmitter circuit 1524 for conversion into modulated RF signals. The transmitter circuit 1524 conveys the RF modulated signals to the antenna 1528 for transmission to the base station 1502. The antenna switch 1526 selectively couples either the receiver circuit 1522 or the transmit circuit 1524 to the antenna 1528.

Each radiotelephone of the plurality of radiotelephones includes similar radio circuitry for communicating with the base station 1502 as well as similar mechanical construction. Structure and operation of a radiotelephone in conjunction with the base station 1502 will be described using radiotelephone 1504 as an example. However, radiotelephone 1506, radiotelephone 1508, radiotelephone 1510 and radiotelephone 1512 are preferably substantially identical to radiotelephone 1504.

The radiotelephone 1504 includes an antenna 1552, an antenna switch 1554, a receiver circuit 1556, a transmitter circuit 1558, a controller 1560, a memory 1562, a user interface 1564 and a sensor or switch 1574. Upon reception of RF signals from the base station 1502, the radiotelephone 1504 receives the RF signals through the antenna 1552. The antenna 1552 converts the RF signals into electrical baseband signals. The receiver circuit 1556 demodulates the electrical baseband signals, recovers the data transmitted on the RF signals and provides clocked data to the controller 1560. The controller 1560 formats the data into recognizable voice or information for use by the user interface 1564. The user interface 1564 communicates the received information or voice to a user.

The user interface 1564 includes a speaker 1566, a microphone 1568, a keypad 1570 and a display 1572. The keypad 1570 includes a standard telephone keypad and optionally includes other function keys as well. The display is a multiple line liquid crystal display (LCD), or any type of suitable display such as a light emitting diode (LED) display. The display optionally includes other visual indicators, such as LED indicators which selectively illuminate to provide user information.

Upon transmission of radio frequency (RF) signals from the radiotelephone 1504 to the base station 1502, the user interface 1564 transmits user input data to the controller 1560. The controller 1560 formats the information obtained from the user interface 1564 and transmits it to the transmitter circuit 1558 for conversion into modulated RF signals. The transmitter circuit 1558 conveys the RF modulated signals to the antenna 1552 for transmission to the base station 1502.

The switch 1574 provides a detection signal in response to detecting the presence of a keypad cover or other movable element on the faceplate, in a manner to be described below. The switch 1574 is coupled to the controller 1560 for providing the detection signal.

Figure 16:
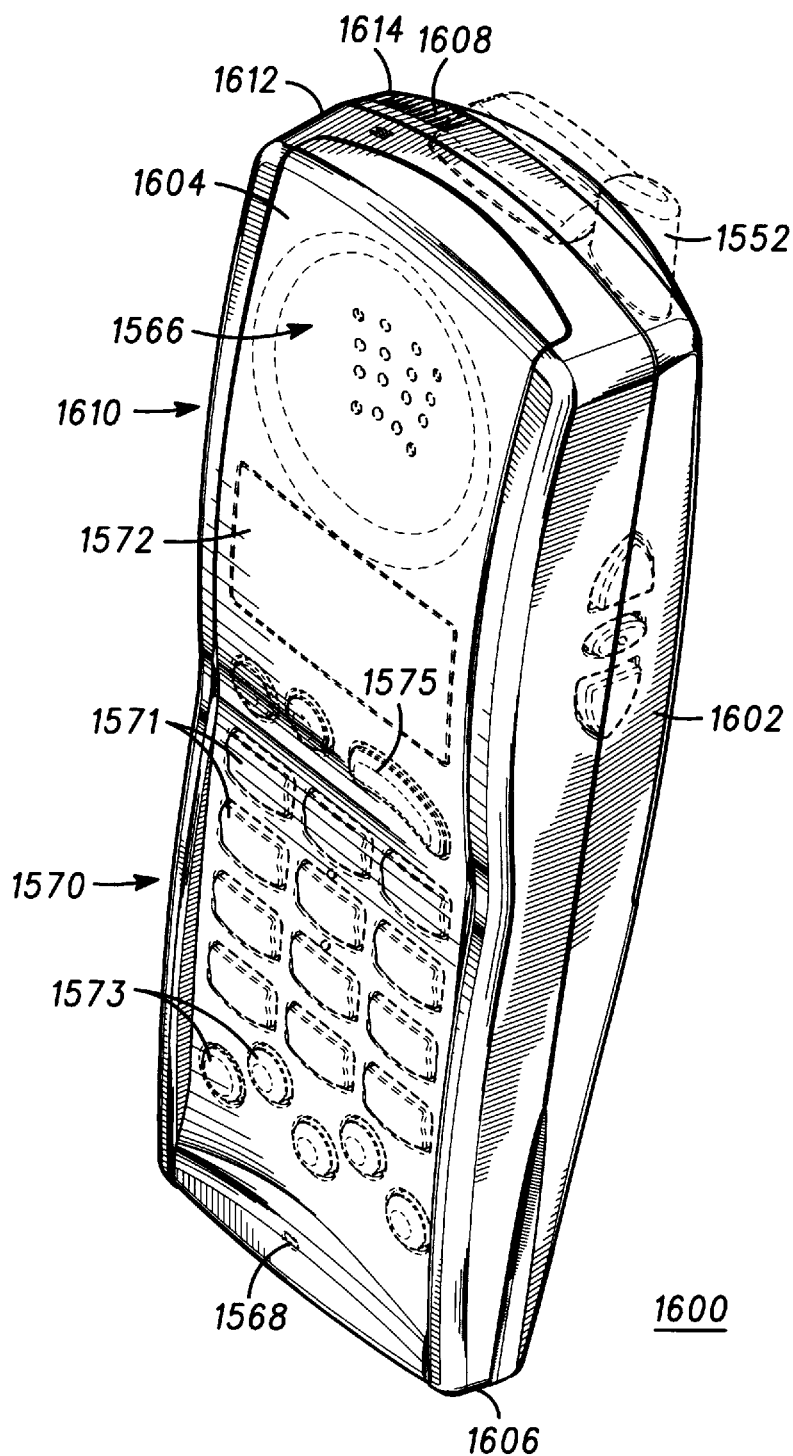
FIG. 16 is a perspective view of a radiotelephone for use in the radiotelephone system of FIG. 15.

Referring now to FIG. 16, a communication device 1600 includes a housing 1602, a first faceplate 1604 and a keypad 1570. The housing 1602 includes a first end 1606 and a second end 1608 and the housing 1602 has a front face 1610. In the illustrated embodiment, the housing 1602 includes a front housing portion 1612 and a rear housing portion 1614 which are mated at the time of assembly. Also in the illustrated embodiment, the housing 1602 is a standard housing having a standard appearance which is combined with other elements, such as a faceplate and keypad to provide a customized appearance.

The keypad 1570 is disposed on the front face 1610 of the housing 1602. The keypad 1570 includes a plurality of keys 1571. The keys 1571 have any suitable size and shape, and the shape and color and other appearance features of the keys differ on different keypads to provide a customized appearance for the communication device 1600. The keypad further includes control keys 1573 including a link key 1575. As will be discussed further below, the link key 1575 in accordance with the present invention is used to establish a radio link with a remote transceiver such as the base station 1502 (FIG. 15).

Figure 17:
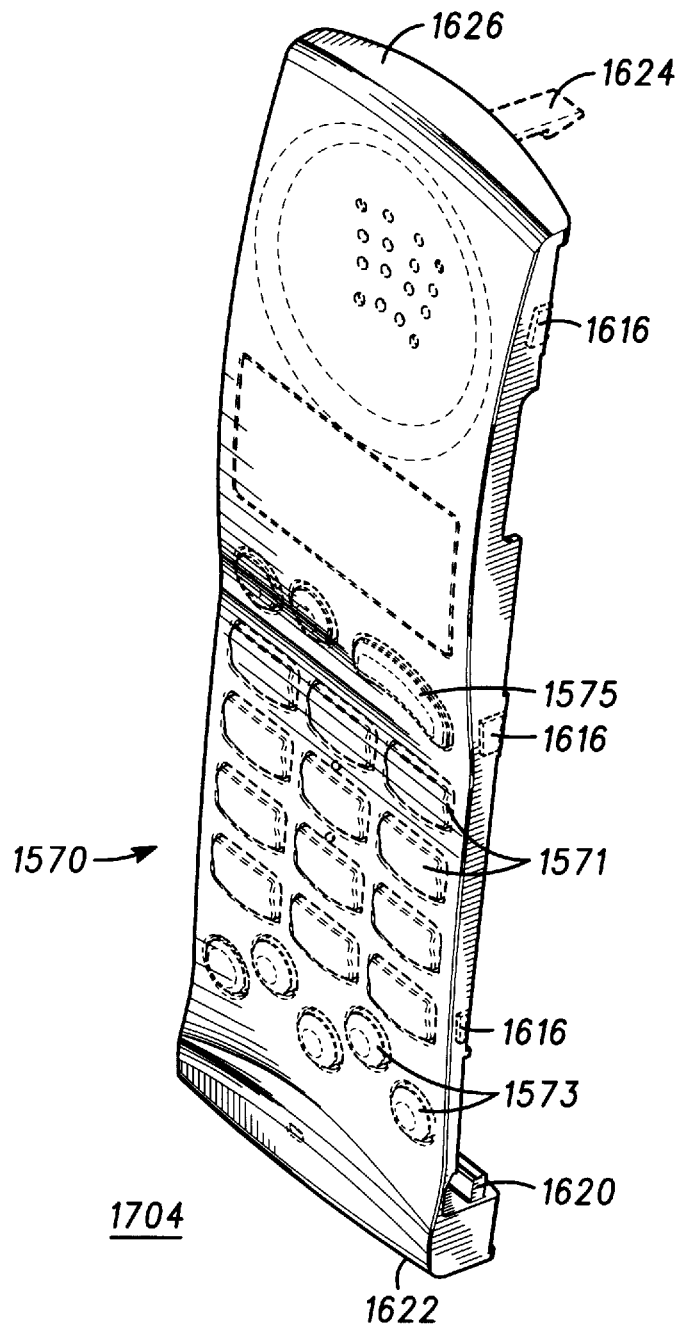
FIG. 17 is a perspective view of a first faceplate for use with the radiotelephone of FIG. 16.

FIG. 17 illustrates the first faceplate 1604. The first faceplate 1604, which is also referred to as an escutcheon, is configured for attachment to the front face 1610 of the housing 1602. The first faceplate 1604 includes tabs 1616 along a perimeter 1618. The front face 1610 of the housing 1602 defines corresponding slots. When the first faceplate 1604 is attached to the front face 1610, the tabs 1616 engage the corresponding slots to retain the first faceplate 1604 on the front face 1610. The first faceplate 1604 further includes a bottom retainer 1620 at a first end 1622 and a top tab 1624 at a second end 1626. The bottom retainer 1620 and the top tab 1624 engage corresponding slots on the housing 1602 and assist in retaining the first faceplate 1604 on the housing 1602. In alternative embodiments, the first faceplate 1604 and the housing 1602 include other features for securing the first faceplate 1604, and other faceplates, to the housing 1602.

In one embodiment, the first faceplate 1604 is permanently affixed to the front face 1610 at the time of manufacture. In accordance with the present invention, to customize the appearance and operation of the phone, and thereby maximize user convenience, the first faceplate 1604 is interchangeable with other faceplates.

In the illustrated embodiment, the communication device 1600 comprises a radiotelephone configured for radio communication with a remote transceiver, such as the base station 1502 (FIG. 15). The first faceplate 1604 omits a movable element which covers a portion of the keypad 1570.

Figure 18:
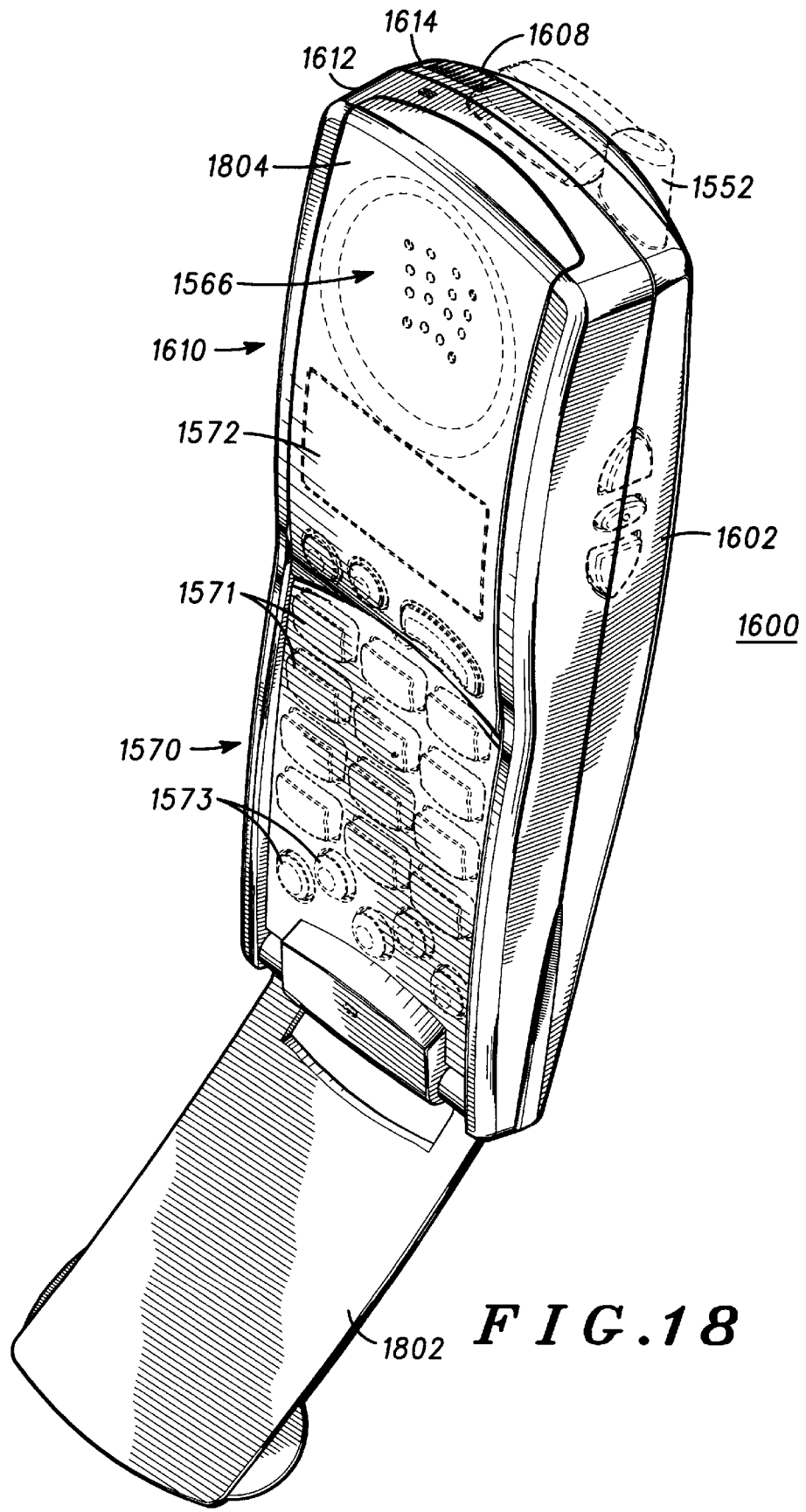
FIG. 18 is a perspective view of a radiotelephone for use in the radiotelephone system of FIG. 15 with a keypad cover in an open position.
Figure 19:
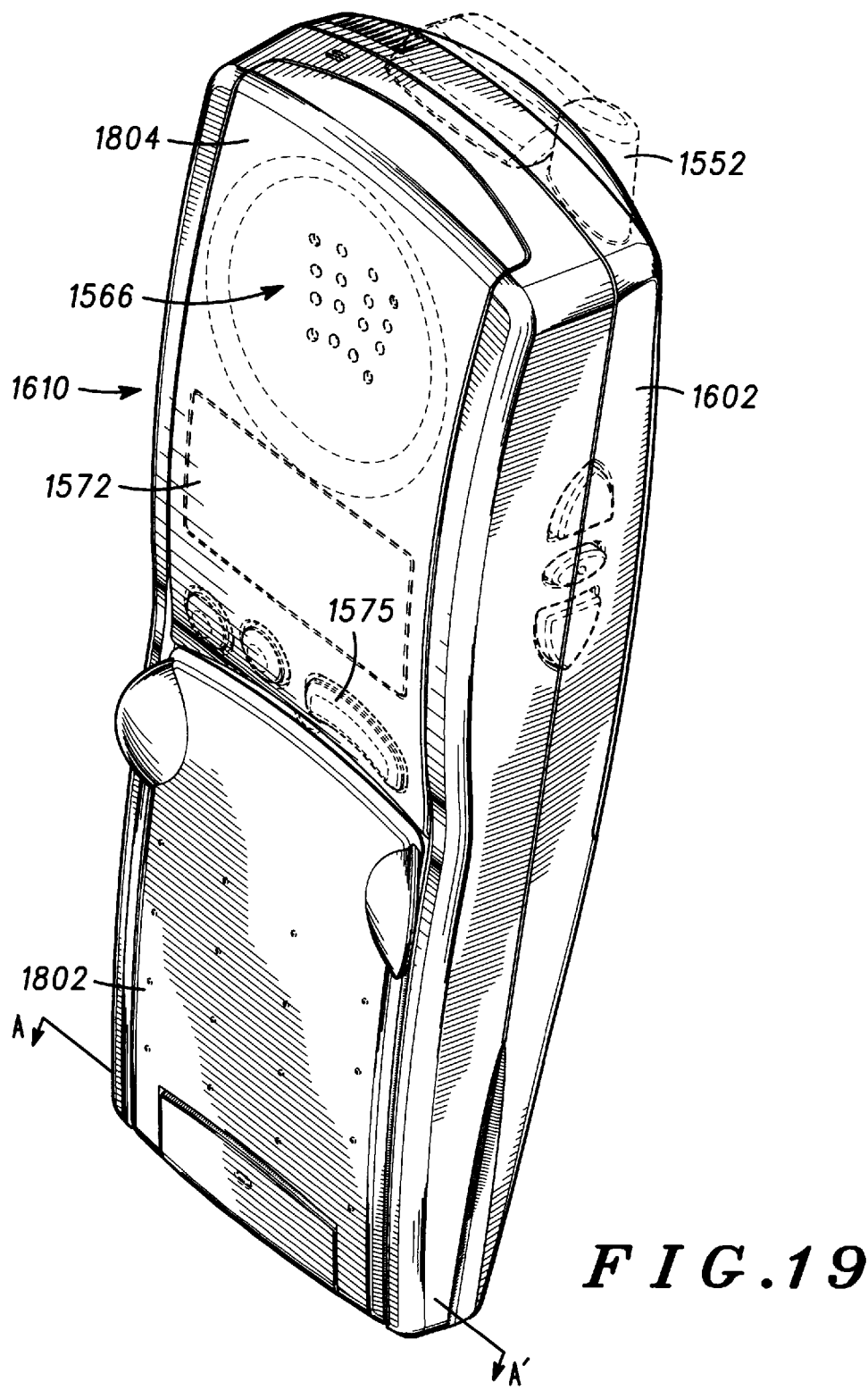
FIG. 19 is a perspective view of the radiotelephone of FIG. 18 with a keypad cover in a closed position.

In FIG. 19 and FIG. 20, the communication device 1600 includes a second faceplate 1804. The second faceplate 1804 is configured for attachment to the front face 1610 of the housing 1602. The second faceplate 1804 includes a moveable element 1802. The movable element 1802 is movable between a first position and a second position. In the illustrated embodiment, the movable element 1802 comprises a keypad cover which is movable between a first or closed position, shown in FIG. 19, and a second or open position shown in FIG. 18. The keypad cover covers a portion of the keypad 1570 in the closed position. In alternate embodiments, the keypad cover covers all or less of the keypad, or also covers other parts of the communication device 1600, such as the display 1572. In other alternative embodiments, the movable element 1802 comprises other movable features of the communication device 1600.

FIG. 20 and FIG. 21 illustrate the second faceplate 1804. Like the first faceplate 1604, the second faceplate 1804 includes tabs 1616 along a perimeter 1618. When the second faceplate 1804 is affixed to the front face 1610, the tabs 1616 engage the corresponding slots on the housing 1602 to retain the second faceplate 1804 on the front face 1610. Also like the first faceplate 1604, the second faceplate 1804 further includes a bottom retainer 1620 at a first end 1622 and a top tab 1624 at a second end 1626. The bottom retainer 1620 and the top tab 1624 assist in retaining the second faceplate 1804 on the housing 1602.

Thus, in one embodiment, the communication device 1600 comprises a portable radiotelephone handset provided with a plurality of faceplates, each faceplate configured for removable attachment to the front face of the standard housing 1602 for customizing appearance of the portable radiotelephone handset. At least one faceplate has a keypad cover movable between a first position and a second position, the keypad cover covering a portion of the keypad in the first position and exposing the portion of the keypad in the second position. A faceplate for the communication device 1600 is configured for attachment to the housing 1602 and is selected from the group consisting of a faceplate including a movable element which is movable between a first position and a second position and a faceplate lacking the movable element.

In this manner, the first faceplate 1604 omitting a movable element is removably interchanged with the second faceplate 1804 including the movable element 1802. The housing 1602, having a standard appearance, is combined with a faceplate having a custom appearance, including or omitting a movable element. The communication device 1600 thus is customized by the manufacturer at the time of manufacturer or by the user at a subsequent time.

In accordance with the present invention, the communication device includes a sensor such as switch 1574 disposed within the housing 1602. The sensor detects attachment of a faceplate to the front face 1610 of the housing 1602 and provides a detection signal in response to detection of a faceplate such as second faceplate 1804 and a movable element such as movable element 1802 disposed on the housing 1602.

The sensor is any type of mechanical or electrical sensor which provides a detection signal which may be interpreted by the controller 1560 as indicative of the presence of a faceplate with a movable element. In one embodiment, the detection signal is a binary electrical signal produced by a switch. The detection signal has a first state when the first faceplate 1604 omitting a movable element is present and a second state when the second faceplate 1804 including a movable element is present. In another embodiment, the sensor detects if a movable element such as the keypad cover is present and detects a position of the keypad cover. In such an embodiment, the binary detection signal has a first state to indicate, for example, presence of the keypad cover and a closed position of the keypad cover, as illustrated in FIG. 19. The binary detection signal has a second state to indicate absence of the keypad cover, as illustrated in FIG. 16, or an open position of the keypad cover, if present, as illustrated in FIG. 18. The sensor provides the detection signal to the controller 1560.

The controller 1560 is responsive to the detection signal for varying the operation of the communication device accordingly. The controller 1560 is coupled to the sensor and implements a first set of functions in response to a first state of the detection signal and a second set of functions in response to a second state of the detection signal.

For example, in one application, the detection signal indicates that the movable element 1802 is present and in a first position, such as a keypad cover closed position. The controller 1560 responds to this detection signal by maintaining the communication device in a standby condition, awaiting reception of incoming RF signals from a remote transceiver such as the base station 1502 to initiate a radio link with the remote transceiver. In another application, the detection signal indicates that the movable element is present and in a second position, such as a keypad cover open position. The controller 1560 responds to this detection signal by awaiting user input. If the detection signal has changed state, for example, from keypad cover closed to keypad cover open, the controller 1560 responds by initiating operation of the communication device 1600 to initiate a radio link with the remote transceiver and to await user input from the keypad 1570 as the user dials a phone number. If the detection signal has changed state from keypad cover open to keypad cover closed, the controller 1560 responds by terminating the radio link with the remote transceiver and returning the communication device 1600 to the standby condition. While other functions are available, this example illustrates operation of the communication device 1600 with an active keypad cover.

In another application, the detection signal indicates that a faceplate such as faceplate 1604 omitting a movable element is present. In this example, in response to this detection signal, the controller 1560 waits to detect a predetermined user input from the keypad 1570. For example, the user may initiate operation of the communication device by first depressing the link key 1575. The controller 1560 detects the keypress of the link key 1575 of the keypad 1570 and initiates a radio link with the remote transceiver. The user subsequently depresses other keys 1571 of the keypad 1570 to dial a telephone call, and eventually depresses the link key 1575 again to terminate the telephone call and terminate the radio link with the remote transceiver.

In another application, operation of the communication device includes detecting at the controller 1560 presence of a keypad cover on the faceplate in response to the detection signal. If a keypad cover is present, the controller 1560 detects a position of the keypad cover. If no keypad cover is present, the controller 1560 awaits a user input from the keypad 1570. Operation also includes moving the keypad cover from a closed position to an open position, detecting movement of the keypad cover, and in response, initiating a communication link to a remote transceiver.

Thus, by providing the sensor to detect presence of a faceplate and a keypad cover, the communication device 1600 according to the present invention may be operated with either a faceplate having a keypad cover or a faceplate omitting a cover. Further, such faceplates are interchangeable, and either may be attached to the standard housing 1602 to customize the appearance and the operation of the communication device 1600.

In FIG. 17 and in FIG. 21, the first faceplate 1604 and the second faceplate 1804 are illustrated assembled with the keypad 1570. Alternatively, the keypad is permanently or detachably assembled with the housing 1602. In yet another embodiment, the keypad 1570 is sold separately along with the first faceplate 1604 or the second faceplate 1604 as a user interface kit for customizing the appearance of the communication device.

FIG. 22 is a rear perspective view of the second faceplate 1804. The second faceplate 1804 includes a body 1830 and a hinge 1832 coupling the movable element 1802 or keypad cover and the body 1830. The hinge 1832 provides rotational movement of the keypad cover between the first position or closed position and the second position or open position. The body 1830 defines apertures 1834 for the keys 1571 and control keys 1573 and the link key 1575 of the keypad 1570. The body 1830 further defines an earpiece 1835 for positioning near the speaker 1566 (FIG. 15). The earpiece 1835 includes holes 1836 which permit sound to pass from the speaker 1566 to the user's ear. The body 1830 further defines a display aperture 1838 to permit viewing of the display 1572 which is disposed on the front face of the housing 1602. The bottom retainer 1620 includes a first retainer 1621 and a second retainer 1623. The body 1830 further defines a cavity 1839 between first retainer 1621 and second retainer 1623 In the illustrated embodiment, the hinge 1832 is at the first end 1622 of the second faceplate 1804 for rotatably moving the keypad cover between the first position and the second position.

Figure 24:
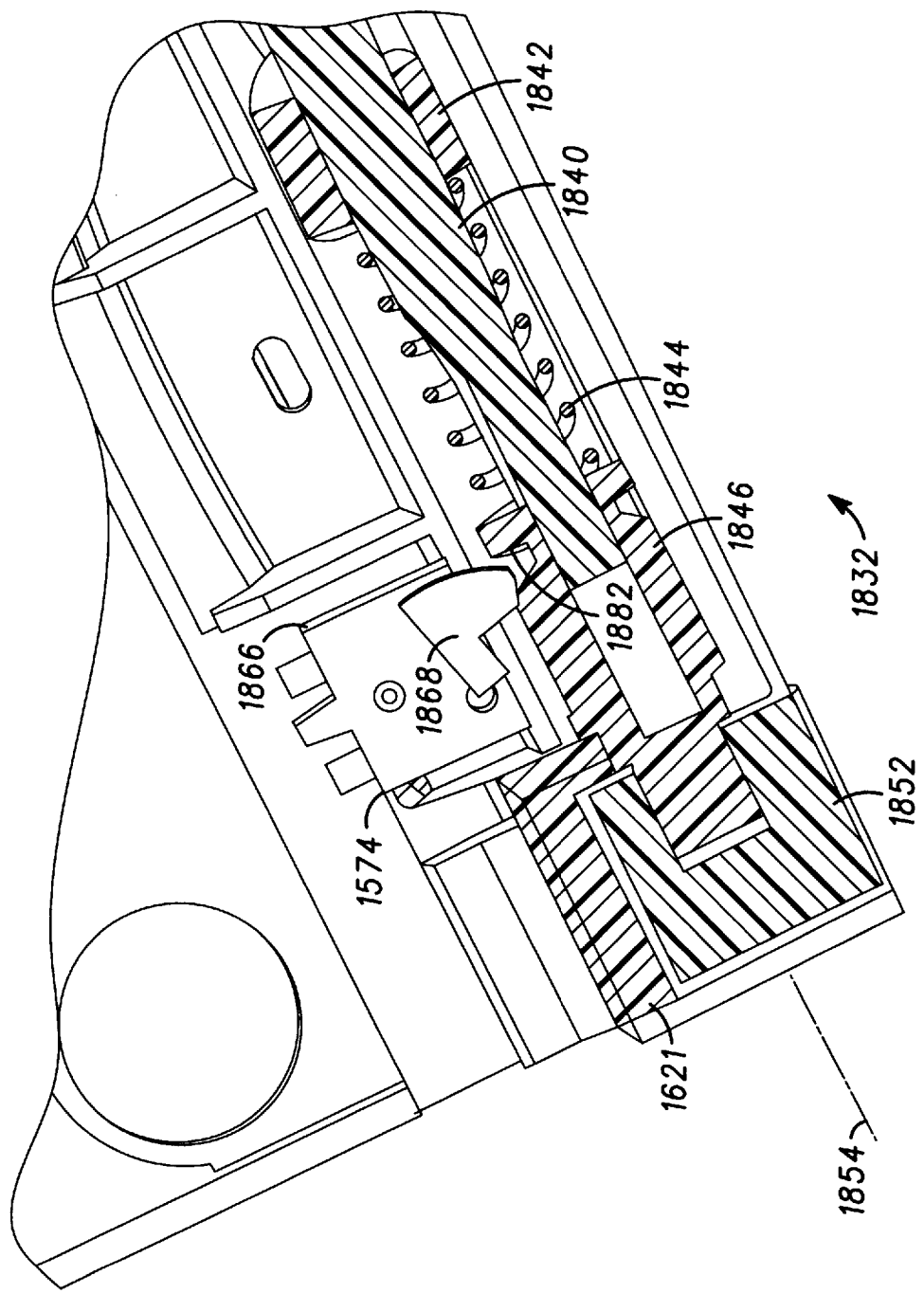
FIG. 24 is a cross sectional view taken along line A–A' in FIG. 19 showing a portion of the communication device.

Referring now to FIG. 23 and FIG. 24, FIG. 23 is a detailed view of a portion of the second faceplate 1804. FIG. 24 is a cross sectional view taken along line A–A' in FIG. 19 showing a portion of the communication device. The hinge 1832 includes a hinge pin 1840, a cam 1842, a spring 1844 and a cam journal 1846. The second retainer 1623 defines a keyway for receiving the hinge pin 1840. The received end of the hinge pin 1840 is sized to fit the keyway. Preferably, the keyway and the received end of the hinge pin 1840 are shaped irregularly or eccentrically so that the hinge pin is maintained in the keyway without rotating when the movable element 1802 is moved or rotated. Alternatively, the hinge pin 1840 is integrally formed with the second retainer 1623 and the rest of the body 1830, as by injection molding a plastic part.

The cam journal 1846 has an end sized to extend through the first retainer 421 and to be received by a hinge knuckle 1852 of the movable element 1802. Retention of the end of the cam journal in the hinge knuckle 1852 is illustrated in FIG. 24. The movable element 1802 is rotatable about an axis 1854 defined by the cam journal 1846 and the hinge pin 1840. As the movable element 1802 is rotated, the cam journal 1846 rotates about the axis 1854.

The hinge pin 1840 has a cam-shaped portion 1850. As the cam journal 1846 rotates with movement of the movable element 1802, the cam-shaped portion 1850 engages the cam 1842. The cam 1842 is annular and sized to rotatingly surround a portion of the hinge pin 1840. The spring 1844 urges the cam 1842 against the cam-shaped portion 1850. As the cam 1842 and the cam-shaped portion 1850 engage, they provide two detent positions for the movable element 1802. A first detent position is the first or closed position of the movable element 1802 and a second detent position is the second or open position of the movable element 1802.

Figure 25:
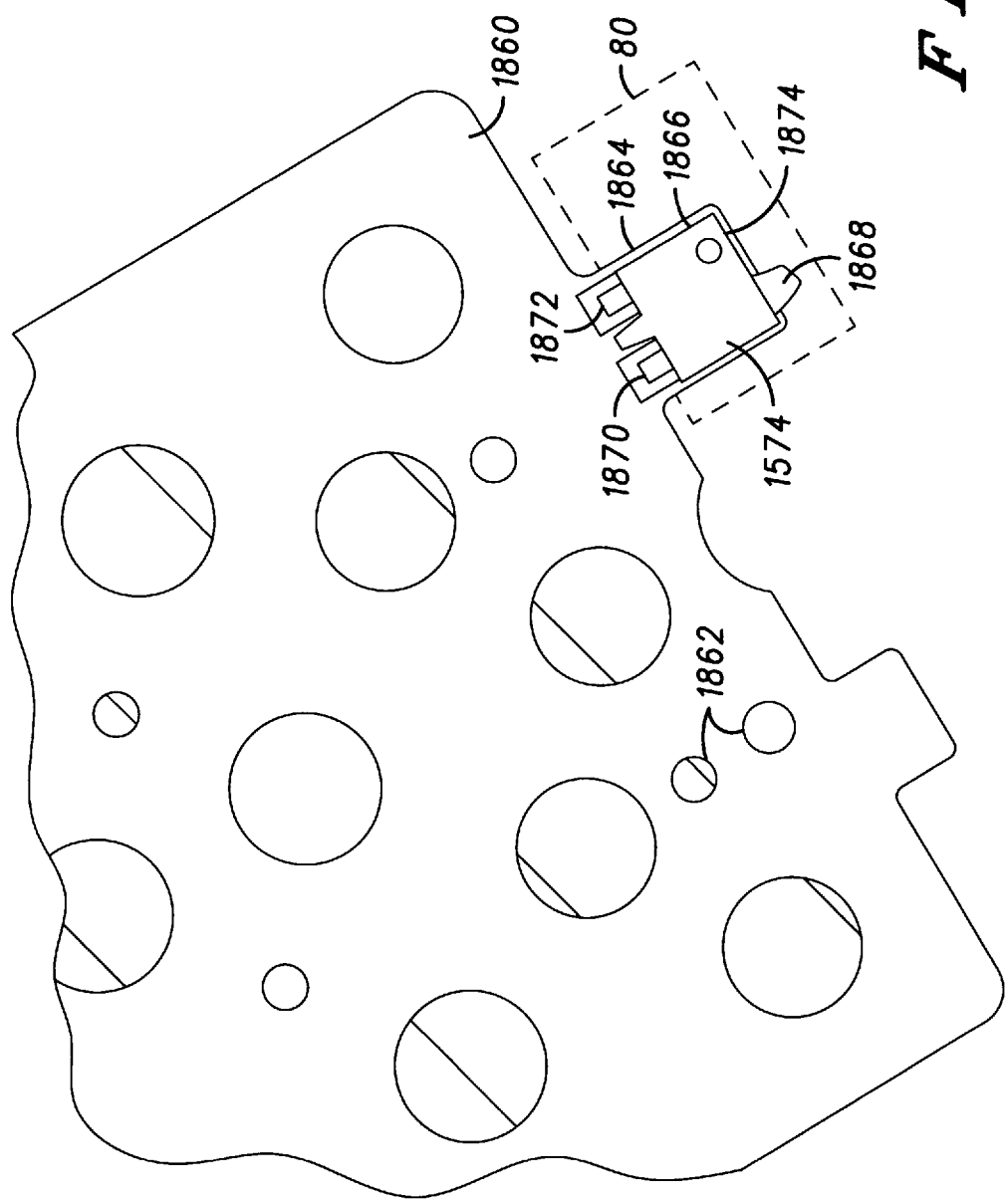
FIG. 25 is a view of a portion of a printed circuit board for use with the radiotelephone of FIGS. 16 and 18.
Figure 26:
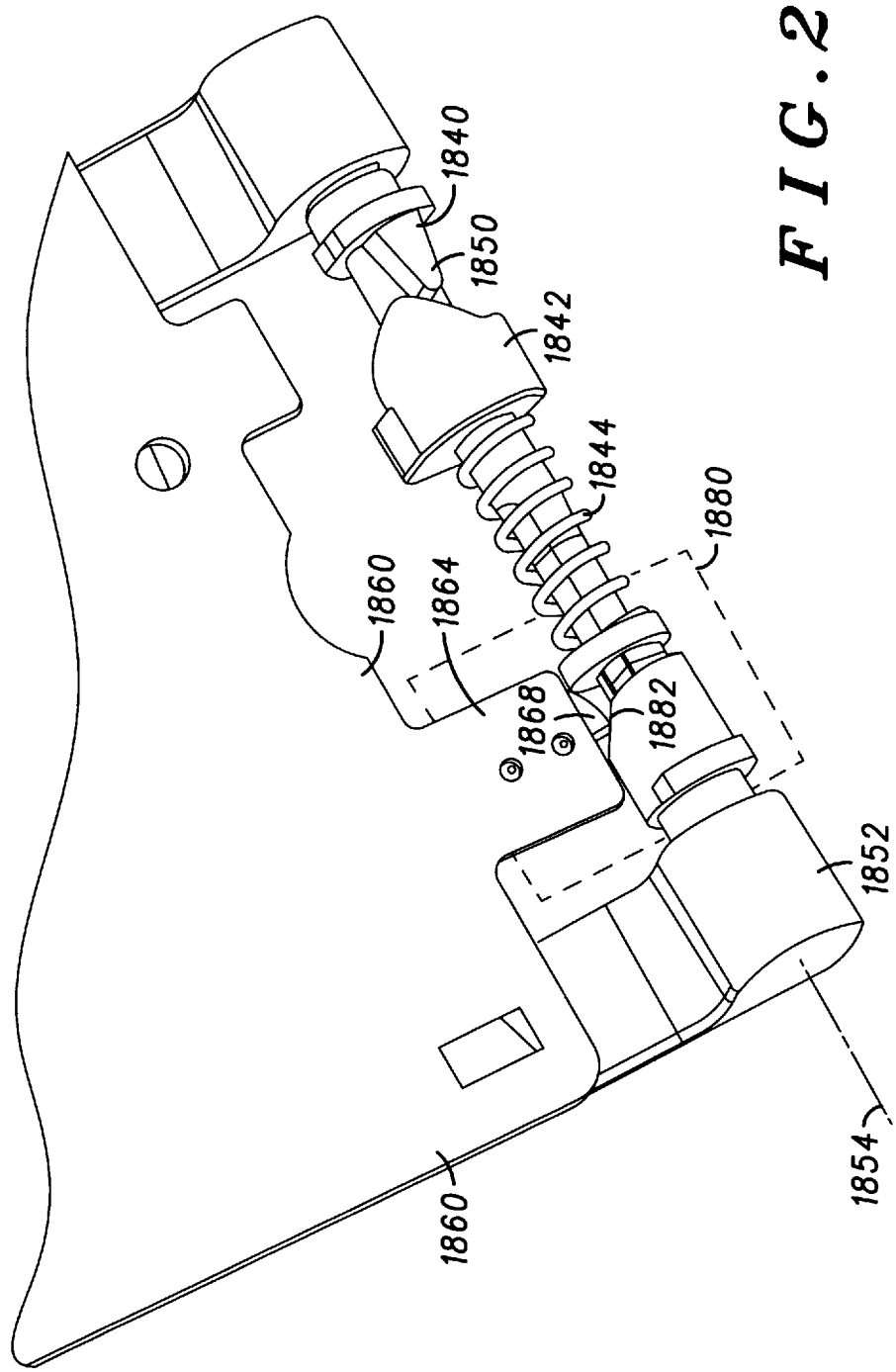
FIG. 26 is a perspective view of a portion of a communication device.

As illustrated in FIG. 25, the communication device 1600 includes a printed circuit board (PCB) 1860 suitable to be disposed within the housing 1602. FIG. 26 is a perspective view of a portion of the communication device showing the PCB 1860 in conjunction with the hinge 1832. The PCB 1860 defines apertures 1862 for soldering circuit elements such as the controller 1560 (FIG. 15) to the PCB 1860. The PCB 1860 includes an extension 1864 proximate the first end 1606 of the housing of the communication device 1600 when the PCB 1860 is assembled in the housing 1602.

The switch 1574 is located on the extension 1864 and is electrically coupled to the controller 1560 using conventional printed circuit board wiring techniques. In the illustrated embodiment, the switch 1574 is a normally open switch. The switch 1574 includes a body 1866, an actuation arm 1868, a first electrical contact 1870 and a second electrical contact 1872. When the communication device 1600 is assembled, the first electrical contact 1870 and the second electrical contact 1872 are electrically coupled to the controller 1560.

The actuation arm 1868 extends from a recess defined in a side 1874 of the body 1866. The actuation arm 1868 is movable between an open position and a closed position. In the open position, the actuation arm 1868 extends substantially fully from the body 1866, as illustrated in FIG. 24. This is the normally open position of the switch 1574, which includes a spring or other bias element urging the actuation arm 1868 out of the body to the open position. In the closed position, the actuation arm 1868 is depressed partly or wholly into the recess. In the closed position, the first electrical contact 1870 and the second electrical contact 1872 are electrically coupled together. In the illustrated embodiment, the switch provides the detection signal to the controller in a first state when the actuation arm 1868 is in the closed position and provides the detection signal in a second state when the actuation arm is in the open position.

In the illustrated embodiment, the switch 1574 lies in a plane 1880 which is generally parallel to the PCB 1860. The switch 1574 and the axis 1854 of rotation of the hinge are preferably coplanar to permit the hinge 1832 to actuate the actuation arm as the hinge 1832 is rotated about the axis 1854.

The cam journal 1846 defines a profiled recess 1882. When the movable element 1802 is in the first position, the actuation arm 1868 extends into the profiled recess 1882. As the movable element 1802 moves from the first position (for example, when a keypad cover is moved from closed to open), the cam journal 1846 engages the actuation arm 1868 and depresses the actuation arm into the recess, moving the actuation arm 1868 from its open position to its closed position. The profiled recess 1882 thus acts as an actuator for the switch 1574.

The profiled recess 1882 is preferably profiled to permit smooth actuation of the switch 1574, without catching on the actuation arm 1868 or without wearing unduly from use over time. While the actuation arm 1868 is shown being actuated by the profiled recess 1882, the actuation may be provided by any suitable structure. For example, in an alternative embodiment, a rotating element of the hinge 1832 includes a protrusion positioned to engage the actuation arm 1868 of the switch 1574. If a sensor other than the switch is used for detecting the presence of the second faceplate 1804, another type of actuator is provided.

The actuation of the switch 1574 along the axis 1854 of rotation is an important improvement over previous plunger-type switch actuators. In a plunger actuator, a plunger or other protrusion extends from the inner surface of the keypad cover and, as the keypad cover is closed, the plunger extends through an opening in the front housing of the communication device to engage and actuate a switch located within the housing on a printed circuit board. Unlike the plunger-type actuator, use of the profiled recess 1882 defined by the cam journal 1846 permits switching to occur at any position of the movable element 1802. The switch point can be changed by merely modifying the cam profile. Secondly, a plunger-type actuator requires an aperture in the front housing to engage the switch on the printed circuit board within. Such apertures admit dirt, water, facial oils and other contaminants which can impair the operation of the communication device. Thirdly, the hinge configuration in accordance with the present invention uses up less space than a plunger-type actuator, which is important in modern portable communication devices, where small size is valued by many customers.

Figure 27:
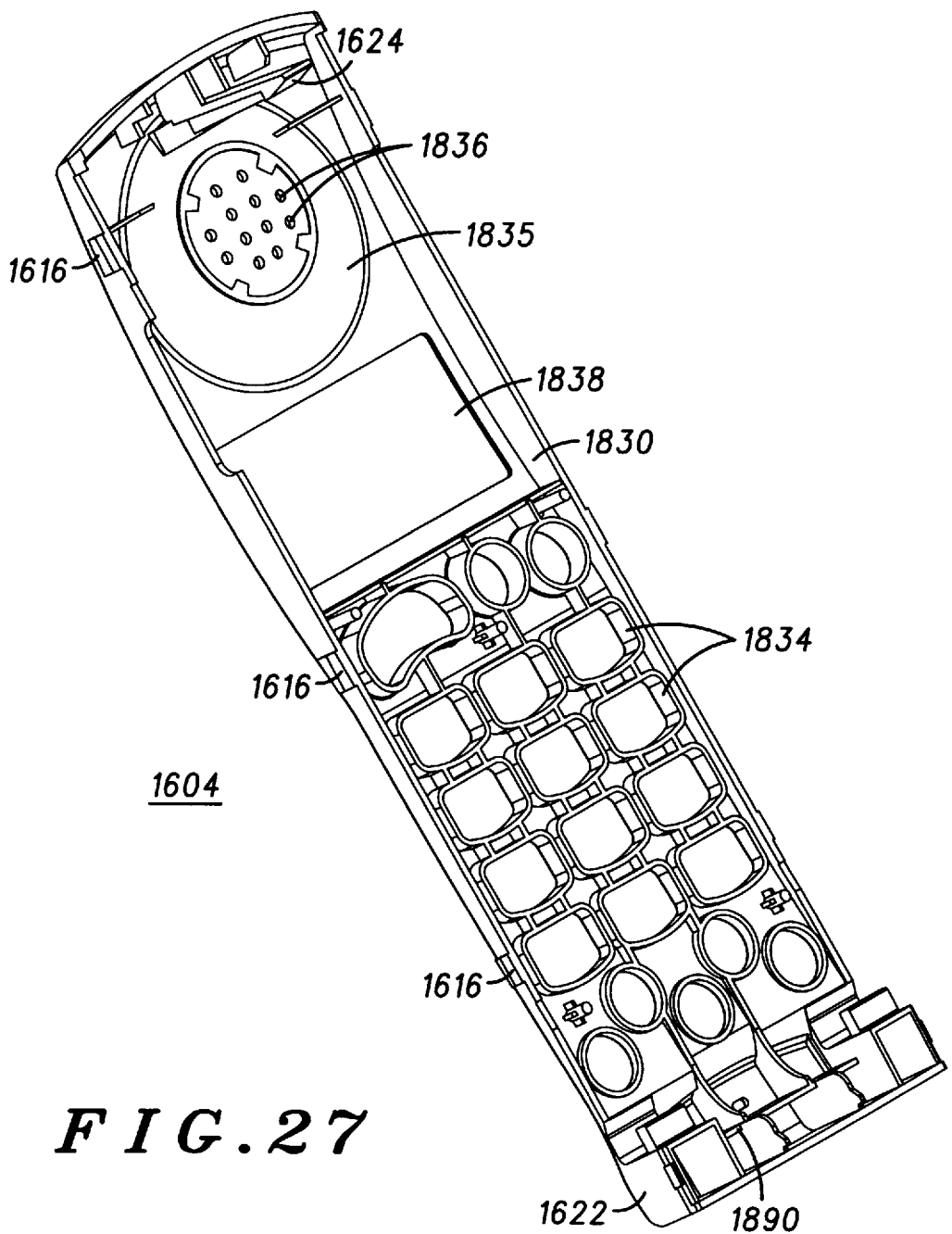
FIG. 27 is a rear perspective view of the first faceplate of FIG. 17.

FIG. 27 is a rear perspective view of the first faceplate of FIG. 17. The first faceplate 1604. FIG. 28 is a detail view of a portion of the first faceplate 1604. The first faceplate 1604 includes a fixed actuator 1890 positioned to retain the actuation arm 1868 in the open position while the first faceplate 1604 is attached to the front face 1610 of the housing 1602. In this manner, the switch provides the detection signal in only the second state when the first faceplate 1604, which omits a movable element, is present. With the detection signal maintained in the second state, the controller 1560 implements only a second set of functions, such as establishing a radio link with the remote transceiver only in response to a keypress of a key of the keypad 1570. The additional functions provided by the presence of the movable element 1802 are not available in this configuration. This aspect of the present invention may be used by the manufacturer to establish product tiering and distinguish individual models.

As can be seen from the foregoing, the present invention provides a communication device such as a portable radiotelephone which features interchangeable faceplates. Interchangeability permits customization of the appearance of the communication device. The faceplates include a faceplate which includes a movable element such as a keypad cover and a faceplate which omits a keypad cover. A sensor detects the presence of the movable element, as well as the position of the movable element so that the operation of the communication device may be varied accordingly. In this manner, the communication device may be customized in performance as well as appearance by providing an active keypad cover. The components which permit the keypad cover to move, such as the hinge pin, cam, cam journal and spring, are self-contained and remain with the second faceplate and keypad cover to minimize the risk of loss during changeover of the faceplate.

While a particular embodiment of the present invention has been shown and described, modifications may be made. For example, the keypad cover may be movably attached to the housing rather than the second faceplate as illustrated herein. Further, the keypad cover, rather than being rotatably coupled, may slide across the face of the communication device or move in any other suitable manner. It is therefore intended in the appended claims to cover all such changes and modifications which fall within the true spirit and scope of the invention.

What is claimed is:

1. A communication device comprising:
   a housing;
   a sensor disposed within the housing, the sensor providing a detection signal in response to detection of a faceplate and a movable element disposed on the housing; and
   a controller disposed within the housing and coupled to the sensor, the controller implementing a first set of functions in response to a first state of the detection signal and a second set of functions in response to a second state of the detection signal.

2. A communication device as recited in claim 1 further comprising a faceplate disposed on the housing, the faceplate including a movable element movable between a first position and a second position.

3. A communication device as recited in claim 2 wherein the sensor comprises a switch which provides the detection signal when actuated and wherein the faceplate includes an actuator for actuating the switch.

4. A communication device as recited in claim 3 wherein the movable element is rotatable about an axis and wherein the actuator actuates the switch when the movable element rotates about the axis from the first position to the second position.

5. A communication device as recited in claim 4 further comprising a printed circuit board (PCB) disposed within the housing, the switch being disposed on the printed circuit board proximate a first end of the communication device, and wherein communication device further includes a hinge proximate the first end of the communication device for rotating the movable element about the axis, the hinge including the actuator.

6. A communication device as recited in claim 5 wherein the switch and the axis are substantially coplanar.

7. A communication device as recited in claim 2 wherein the communication device comprises a radiotelephone configured for radio communication with a remote transceiver and wherein the first set of functions comprises establishing a radio link with the remote transceiver when the movable element moves from the first position to the second position.

8. A communication device as recited in claim 2 further comprising a keypad disposed on the housing, the movable element forming a keypad cover for covering a portion of the keypad in the first position.

9. A communication device as recited in claim 1 further comprising a keypad and a faceplate disposed on the housing, the faceplate omitting a movable element which covers a portion of the keypad.

10. A communication device as recited in claim 9 wherein the communication device comprises a radiotelephone configured for radio communication with a remote transceiver and wherein the second set of functions comprises establishing a radio link with the remote transceiver in response to a keypress of a key of the keypad.

11. A communication device as recited in claim 10 wherein the faceplate omitting a movable element may be removably interchanged with a faceplate including a movable element, the sensor providing the detection signal in response to detecting the faceplate including a movable element when the faceplate omitting a movable element is replaced with the faceplate including a movable element.

12. A method of operating a communication device, the communication device including a keypad and a faceplate, the method comprising the steps of:
   detecting presence of a keypad cover on the faceplate;
   if a keypad cover is present, detecting a position of the keypad cover; and
   if no keypad cover is present, awaiting a user input from the keypad.

13. A method as recited in claim 12 further comprising the steps of:
   moving the keypad cover from a closed position to an open position;
   detecting movement of the keypad cover; and
   in response, initiating a communication link to a remote transceiver.

14. A method as recited in claim 12 further comprising the steps of:
   detecting a predetermined user input; and
   in response, initiating a communication link to a remote transceiver.

15. A method as recited in claim 14 wherein the step of detecting a predetermined user input comprises detecting a keypress of a link key of the keypad.

16. A radiotelephone comprising:
   a housing having a front face;
   a keypad disposed on the front face;
   a first faceplate configured for attachment to the front face;
   a second faceplate configured for attachment to the front face, the second faceplate including a keypad cover movable between a first position and a second position, the keypad cover covering a portion of the keypad in the first position;
   a sensor for detecting attachment of a faceplate to the front face and providing a detection signal, the detection signal having a first state when the first faceplate is attached and a second state when the second faceplate is attached; and
   a controller responsive to the detection signal for varying operation of the radiotelephone.

17. A radiotelephone as recited in claim 16 further comprising a hinge at a first end of the second faceplate for rotatably moving the keypad cover between the first position and the second position and wherein the sensor comprises a switch responsive to position of the hinge for providing the detection signal.

18. A radiotelephone as recited in claim 17 wherein the hinge comprises a cam journal defining a profiled recess, the cam journal rotating in response to rotation of the keypad cover, and wherein the switch includes an actuation arm movable between an open position and a closed position, the profiled recess selectively engaging the actuation arm to move the actuation arm between the closed position and the open position as the cam journal rotates with the keypad cover.

19. A radiotelephone as recited in claim 18 wherein the first faceplate includes a fixed actuator positioned to retain the actuation arm in the open position while the first faceplate is attached to the front face.

20. A radiotelephone as recited in claim 19 wherein the switch provides the detection signal in the first state when the actuation arm is in the closed position and provides the detection signal in the second state when the actuation arm is in the open position.

21. A radiotelephone as recited in claim 20 wherein the radiotelephone is configured for radio communication with a remote transceiver and wherein, in response to the detection signal changing from the first state to the second state, the controller establishes a radio link with the remote transceiver.

22. A radiotelephone as recited in claim 21 wherein, in response to the detection signal being maintained in the second state, the controller awaits a predetermined user input.

23. A radiotelephone as recited in claim 22 wherein the predetermined user input comprises a keypress of a link key of the keypad.

24. A communication device comprising:
   a housing;
   a keypad disposed on a front face of the housing;
   a faceplate configured for attachment to the housing, the faceplate selected from the group consisting of a faceplate including a movable element which is movable between a first position and a second position, and a faceplate lacking a movable element;
   a sensor disposed within the housing for providing a detection signal in response to attachment of the faceplate including the movable element; and
   a controller disposed within the housing, the controller implementing a first set of functions in response to the detection signal and a second set of functions in response to absence of the detection signal.

25. A communication device as recited in claim 24 wherein the communication device further comprises the faceplate including a movable element, and wherein in response to the detection signal, the communication device operates responsive to movement of the movable element between the first position and the second position and in response to absence of the detection signal, the communication device operates responsive to a predetermined user input at the keypad.

26. A communication device as recited in claim 25 wherein the predetermined user input comprises a keypress of a link key of the keypad.

27. A portable radiotelephone handset comprising:
   a standard housing having a front face;
   a keypad configured to be disposed on the front face;
   a plurality of faceplates, each faceplate configured for removable attachment to the front face of the standard housing for customizing appearance of the portable radiotelephone handset, at least one faceplate having a keypad cover movable between a first position and a second position, the keypad cover covering a portion of the keypad in the first position and exposing the portion of the keypad in the second position;
   a sensor for sensing attachment to the front face of the standard housing of a faceplate having keypad cover and providing a detection signal; and
   a controller which implements a first set of functions in response to a first state of the detection signal and a second set of functions in response to a second state of the detection signal.

28. A portable radiotelephone handset as recited in claim 27 wherein the at least one faceplate further comprises a body and a hinge coupling the keypad cover and the body, the hinge providing rotational movement of the keypad cover between the first position and the second position.

29. A portable radiotelephone handset as recited in claim 28 wherein the sensor provides the detection signal having the first state when the keypad cover is in the first position and the second state when the keypad cover is in the second position.

30. A portable radiotelephone handset as recited in claim 28 wherein the plurality of faceplates include a faceplate omitting a keypad cover and wherein the sensor provides the detection signal having the first state when the faceplate omitting a keypad cover is attached to front face of the standard housing.

31. A method for operating a communication device, the communication device including
   a switch which is movable between a first position and a second position, and
   one of a first faceplate and a second faceplate disposed on the communication device, the first faceplate lacking a keypad cover and the second faceplate having a keypad cover,
      motion of the keypad cover actuating the switch between the first position and the second position when the second faceplate is disposed on the communication device and the keypad cover is present,
      the first faceplate including a fixed actuator for retaining the switch in one of the first position and the second position when the first faceplate is present,
   the method comprising the steps of:

initially detecting a position of the switch, the position being one of a first position and a second position;

in response to detection of the first position of the switch, determining that the communication device includes the second faceplate;

subsequently, detecting position of the keypad cover in response to actuation of the switch by movement of the keypad cover; and in response to detection of the second position of the switch, determining that the communication device includes the first faceplate.

32. A method as recited in claim 31 further comprising the steps of:

implementing a first set of functions in response to determining that the communication device includes the first faceplate; and implementing a second set of functions in response to determining that the communication device includes the second faceplate.

33. A method as recited in claim 32 wherein the second set of functions includes maintaining the communication device in a standby condition awaiting reception of incoming radio signals when the keypad cover is in the first position and awaiting user input to initiate communication when the keypad cover is in the second position.

\* \* \* \* \*